(12) United States Patent
Okubo et al.

(10) Patent No.: US 8,411,906 B2
(45) Date of Patent: Apr. 2, 2013

(54) IMAGE PROCESSING APPARATUS, IMAGE PROCESSING METHOD, IMAGE RECOGNITION APPARATUS, AND IMAGE RECOGNITION METHOD

(75) Inventors: Atsushi Okubo, Tokyo (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 1245 days.

(21) Appl. No.: 11/951,437

(22) Filed: Dec. 6, 2007

(65) Prior Publication Data

US 2008/0137917 A1 Jun. 12, 2008

(30) Foreign Application Priority Data

Dec. 8, 2006 (JP) ................ P2006-332302

(51) Int. Cl.
*G06K 9/00* (2006.01)
(52) U.S. Cl. .................. 382/115; 382/182
(58) Field of Classification Search .......... 382/182, 382/115
See application file for complete search history.

(56) References Cited

U.S. PATENT DOCUMENTS

| 7,369,686 | B2 | 5/2008 | Yokono et al. | |
|---|---|---|---|---|
| 2003/0023910 | A1* | 1/2003 | Myler et al. | 714/704 |
| 2004/0017944 | A1* | 1/2004 | Ding et al. | 382/182 |
| 2005/0036649 | A1 | 2/2005 | Yokono et al. | |
| 2005/0102246 | A1* | 5/2005 | Movellan et al. | 706/12 |
| 2007/0098255 | A1* | 5/2007 | Yokono | 382/159 |
| 2008/0137917 | A1* | 6/2008 | Okubo et al. | 382/118 |
| 2008/0144941 | A1* | 6/2008 | Togashi | 382/207 |

FOREIGN PATENT DOCUMENTS

| EP | 1 343 115 | 9/2003 |
|---|---|---|
| JP | 05-303645 | 11/1993 |
| JP | 6-168318 | 6/1994 |
| JP | 11-175724 | 7/1999 |
| JP | 2001-167273 | 6/2001 |
| JP | 2005-044330 | 2/2005 |
| JP | 2006-190201 | 7/2006 |
| JP | 2006-202049 | 8/2006 |
| JP | 2006-268825 | 10/2006 |
| WO | WO 03/019475 | 3/2003 |
| WO | WO 03/019475 A1 | 3/2003 |

OTHER PUBLICATIONS

Chengjun Liu et al., "Independent Component Analysis of Gabor Features for Face Recognition", IEEE Transactions on Neural Networks, vol. 14, No. 4, Jul. 2003, pp. 919-928.

(Continued)

*Primary Examiner* — Hadi Akhavannik
(74) *Attorney, Agent, or Firm* — Finnegan Henderson Farabow Garrett & Dunner LLP

(57) ABSTRACT

The present invention provides an information processing apparatus including combination generating means for getting a first feature quantity of N dimensions, N being an integer of at least two, from first information prepared for execution of learning and use the first feature quantity of N dimensions to generate at least two of a first feature quantity combination that are not greater than N dimensions of the first feature quantity; and learning processing executing means for computing a correlation coefficient between the plurality of first feature quantity combinations generated by the combination generating means and a learning model feature quantity matching each dimension of the plurality of first feature quantity combinations and, by use of the first correlation coefficient, classify the first information, thereby executing learning processing for classifying predetermined second information.

26 Claims, 15 Drawing Sheets

OTHER PUBLICATIONS

Shen et al., "Gabor Wavelets and General Discriminant Analysis for Face Identification and Verification", Image and Vision Computing, vol. 25, No. 5, Jun. 30, 2006, pp. 553-563.

Shen et al., "Mutual Boost Learning for Selecting Gabor Features for Face Recognition", Pattern Recognition Letters, vol. 27, No. 15, Nov. 2006, pp. 1758-1767.

Wei Fan, et al., "Combining Null Space-based Gabor Features for Face Recognition", Pattern Recognition, Proceedings of the 17th International Conference on Cambridge, UK., vol. 1, Aug. 23, 2004, pp. 330-333.

* cited by examiner

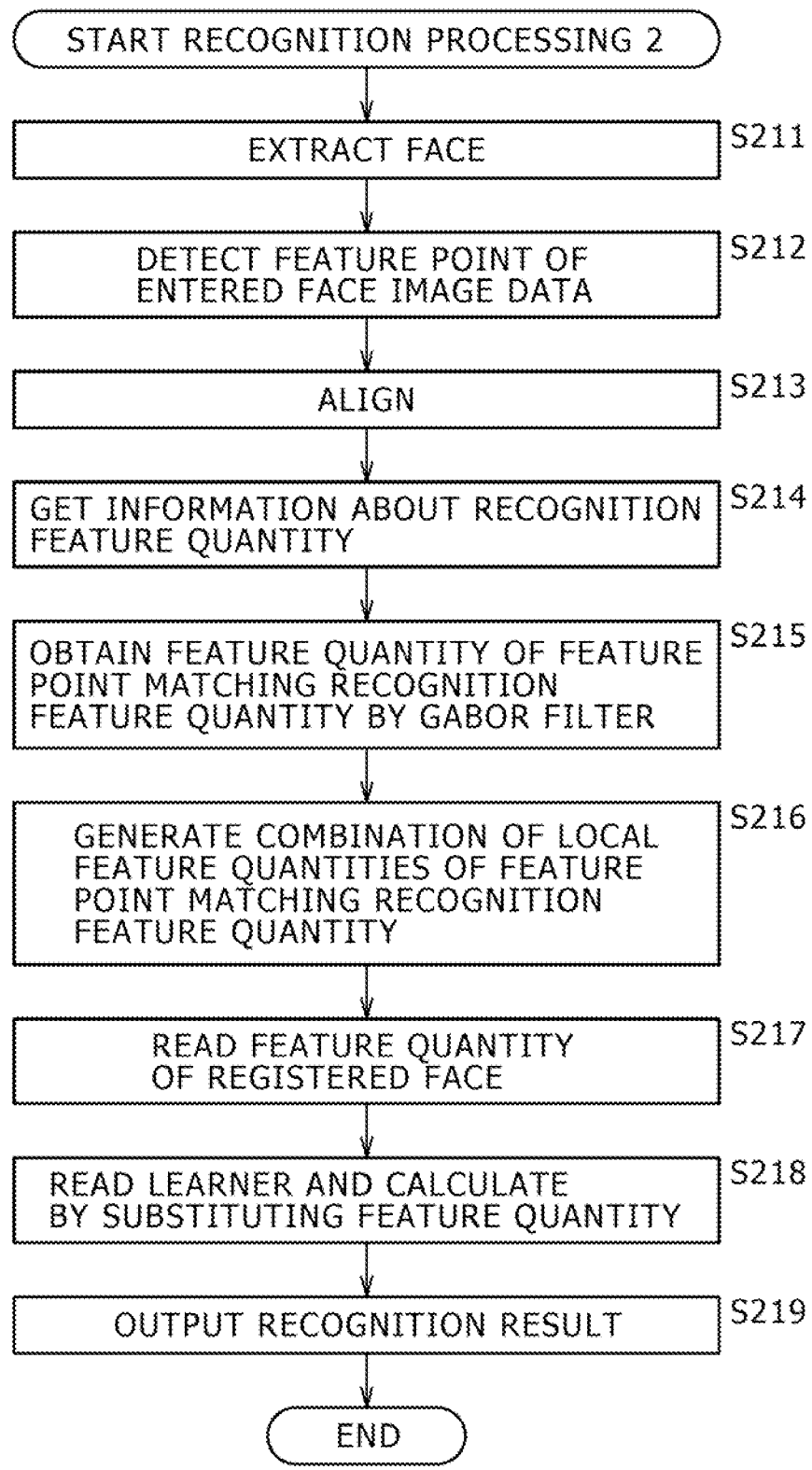

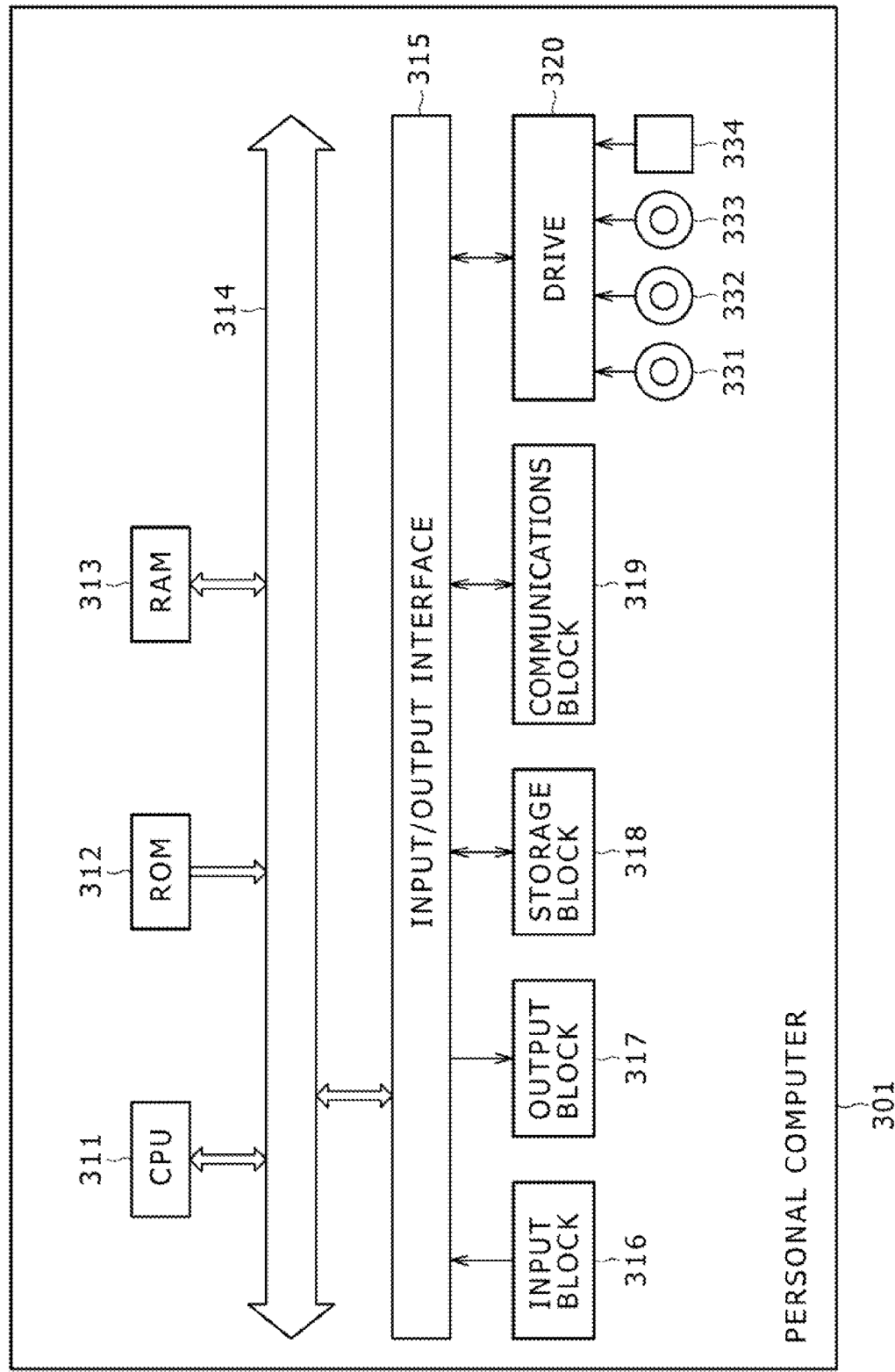

IMAGE PROCESSING APPARATUS, IMAGE PROCESSING METHOD, IMAGE RECOGNITION APPARATUS, AND IMAGE RECOGNITION METHOD

CROSS REFERENCES TO RELATED APPLICATIONS

The present invention contains subject matter related to Japanese Patent Application JP 2006-332302 filed in the Japan Patent Office on Dec. 8, 2006, and Japanese Patent Application JP 2007-218727 filed in the Japan Patent Office on Aug. 24, 2007, the entire contents of which being incorporated herein by reference.

BACKGROUND OF THE INVENTION

1. Field of the Invention

The present invention relates to an information processing apparatus and an information processing method, a recognition apparatus and an information recognition method, and a program and, more particularly, to an information processing apparatus and an information processing method, a recognition apparatus and an information recognition method, and a program that are suitable for executing recognition processing by use of the correlation between two feature quantities.

2. Description of the Related Art

A technology is known in which, in the identification of whether two face images are of a same person, local feature vectors (or Gabor jets) of various feature points of a face are extracted by use of a Gabor filter and a correlation vector composed of only the correlation values of all dimensions of the Gabor filter is learned by use of a SVM (Support Vector Machine) to generate an identification device by which identifying processing is executed (refer to Published Application WO03/019475).

SUMMARY OF THE INVENTION

In the above-mentioned related-art technology, the Gabor jets of various feature points of a face are extracted and a correlation vector made up of only the correlation values of all dimensions of the Gabor filter is learned by use of the SVM, thereby generating an identifying device. However, it is not always necessary to use all Gabor jets for the description of the local feature quantity at each face feature point; for example, it is considered that there are many feature points with some of Gabor jets (or a part of Gabor features making up each Gabor jet) not correlated with local image features.

Taking a correlation between local features vectors made up of Gabor jets including Gabor features not associated with the above-mentioned local feature indicates a high possibility that non-correlated feature quantities give adverse effects. Also, it is possible that, in some local image features, mutually independent features are combined; however, taking correlations between all local features maybe cannot independently extract the similarity therebetween.

Therefore, the present invention addresses the above-identified and other problems associated with related-art methods and apparatuses and solves the addressed problems by providing an information processing apparatus and an information processing method, a recognition apparatus and an information recognition method, and a program that are configured to significantly enhance the accuracy of the recognition in the execution on information processing the basis of a correlation between two feature quantities.

In carrying out the invention and according to a first embodiment thereof, there is provided an information processing apparatus. This information processing apparatus has combination generating means for getting a first feature quantity of N dimensions (N being an integer of at least two) from first information prepared for execution of learning and using the first feature quantity of N dimensions to generate at least two of first feature quantity combination that are not greater than N dimensions of the first feature quantity; and learning processing executing means for computing a correlation coefficient between the plurality of first feature quantity combinations generated by the combination generating means and a learning model feature quantity matching each dimension of the plurality of first feature quantity combinations and, by use of the first correlation coefficient, classifying the first information, thereby executing learning processing for classifying predetermined second information.

In the above-mentioned information processing apparatus, the combination generating means generates the plurality of first feature quantity combinations by combining the first feature quantity combination included in an area continuous in a matrix with elements constituting the first feature quantity of the N dimensions classified by property.

In the above-mentioned information processing apparatus, the first feature quantity of the N dimensions is a feature quantity obtained by N Gabor filters.

In the above-mentioned information processing apparatus, the combination generating means generates a plurality of the first feature quantity combinations by combining the first feature quantity included in a area continuous in a matrix generated as classified by a filter frequency and a filter direction of the N Gabor filters in a feature quantity obtained by the N Gabor filters.

In the above-mentioned information processing apparatus, the combination generating means generates a plurality of the first feature quantity combinations by combining the first feature quantity included in a rectangular area for including a filter frequency and a filter direction in a predetermined range in a matrix generated as classified by a filter frequency and a filter direction of the N Gabor filters in a feature quantity obtained by the N Gabor filters.

In the above-mentioned information processing apparatus, the learning processing executing means executes the learning processing by classifying the first information by use of a boosting algorithm.

In the above-mentioned information processing apparatus, the combination generating means gets, from the second information, predetermined second feature quantity not greater than N dimensions determined beforehand on the basis of a predetermined learner generated in the learning processing executed by the learning processing executing means, thereby further generating a plurality of second feature quantity combinations not greater than N dimensions of the second feature quantity determined beforehand on the basis of the learner, further having classification processing executing means for computing a second correlation coefficient between the plurality of second feature quantity combinations generated by the combination generating means and a registered feature quantity matching each dimension of the plurality of second feature quantity combinations, thereby classifying the second information by use of the obtained second correlation coefficient and the learner.

In carrying out the invention and according to another first embodiment thereof, there is provided an information processing method configured for use in an information processing apparatus for executing learning for classification processing. This information processing methods has the steps of getting a first feature quantity of N dimensions (N being an integer of at least two) from first information prepared for executing learning; generating a plurality of first feature quantity combinations that are not greater than N dimensions of the first feature quantity by use of the first feature quantity of N dimensions; getting a learning model feature quantity matching each dimension of the plurality of first feature quantity combinations to compute a first correlation coefficient between the plurality of first feature quantity combinations and the learning model feature quantity; and classifying predetermined second information by classifying the first information by use of the first correlation coefficient.

The above-mentioned information processing method further has the steps of getting a second feature quantity not greater than N dimensions determined beforehand on the basis of a learner obtained as a result of learning by the learning processing from the second information supplied to be classified by classification processing; generating a plurality of second feature quantity combinations that are not greater than N dimensions of the second feature quantity determined beforehand on the basis of the learner by use of the second feature quantity not greater than N dimensions; getting a registered feature quantity matching each dimension of the plurality of second feature quantity combinations; computing a second correlation coefficient between the plurality of second feature quantity combinations and the registered feature quantity; and classifying the second information by use of the learner obtained as a result of learning by the learning processing and the second correlation coefficient.

In carrying out the invention and according to still another first embodiment thereof, there is provided a program configured to make a computer execute learning for classifying. This program the steps of getting a first feature quantity of N dimensions (N being an integer of at least two) from first information prepared for execution of learning; generating a plurality of first feature quantity combinations not greater than N dimensions of the first feature quantity by use of the first feature quantity of N dimensions; getting learning model feature quantity matching each dimension of the plurality of first feature quantity combinations to compute a first correlation coefficient between the plurality of first feature quantity combinations and the learning model feature quantity; and executing learning processing for classifying predetermined second information by classifying the first information by use of the first correlation coefficient.

The above-mentioned program further has the steps of getting a second feature quantity of not greater than N dimensions predetermined on the basis of a learner obtained as a result of the learning by the learning processing from the second information supplied to be classified by classification processing; generating a plurality of second feature quantity combinations not greater than N dimensions of the second feature quantity determined beforehand on the basis of the learner by use of the second feature quantity not greater than N dimensions; getting a registered feature quantity matching each dimension of the plurality of second feature quantity combinations; computing a second correlation coefficient between the plurality of second feature quantity combinations and the registered feature quantity; and classifying the second information by use of the learner obtained as a result of the learning by the learning processing and the second correlation coefficient.

In carrying out the invention and according to a second embodiment thereof, there is provided a recognition apparatus capable of getting a feature quantity of N dimensions (N being an integer of at least two) to execute recognition processing for classifying predetermined information by use of a predetermined learner obtained as a result of learning processing. This recognition apparatus has combination generating means for getting, from the predetermined information, the predetermined feature quantity less than N dimensions determined beforehand on the basis of the learner to generate a plurality of feature quantity combinations less than N dimensions of the feature quantity determined beforehand on the basis of the learner; and classification processing executing means for computing a correlation coefficient between the plurality of feature quantity combinations generated by the combination generating means and a registered feature quantity matching each dimension of the plurality of feature quantity combinations to classify the predetermined information on the basis of the learner by use of the correlation coefficient.

In the above-mentioned recognition apparatus, the feature quantity combinations less than N dimensions determined beforehand on the basis of the learner are the plurality of feature quantity combinations included in a continuous area in a matrix with elements constituting the feature quantity of the N dimensions classified by property.

In the above-mentioned recognition apparatus, the feature quantity is a quantity obtained by any of a plurality of Gabor filters.

In the above-mentioned recognition apparatus, the plurality of feature quantity combinations less than N dimensions determined beforehand on the basis of the learner are a plurality of combinations in which the feature quantity included in a continuous area in a matrix generated as classified by a filter frequency and a filter direction of the plurality of Gabor filters is combined.

In the above-mentioned recognition apparatus, the plurality of feature quantity combinations less than N dimensions determined beforehand on the basis of the learner are a plurality of combinations in which the feature quantity included in a rectangular area for including a filter frequency and a filter direction in a predetermined range in a matrix generated as classifying by a filter frequency and a filter direction of the plurality of Gabor filters.

In the above-mentioned recognition apparatus, the classification processing executing means classifies the predetermined information by use of a boosting algorithm.

In carrying out the invention and according to another second embodiment thereof, there is provided an information recognition method for use in a recognition apparatus having a predetermined learner obtained as a result of learning processing and a storage for storing information about a feature quantity for recognition and capable of getting a feature quantity of N dimensions (N being an integer of at least two) to execute recognition processing for classifying predetermined information. The above-mentioned information recognition method has the steps of: getting a feature quantity matching the feature quantity for recognition of the predetermined feature quantity not greater than N dimensions determined beforehand on the basis of the learner by use of the learner and the feature quantity for recognition stored in the storage; generating a plurality of feature quantity combinations not greater than N dimensions of the feature quantity matching the feature quantity for recognition from the predetermined information by use of the learner and the feature quantity for recognition stored in the storage; getting a registered feature quantity matching each dimension of the plurality of feature quantity combinations; computing a correlation coefficient between the generated plurality of feature quantity combinations and the registered feature quantity matching each dimension of the plurality of feature quantity combinations; and classifying the predetermined information on the basis of the learner by use of the correlation coefficient.

In carrying out the invention and according to still another second embodiment thereof, there is provided a program configured to make a computer execute recognition processing for classifying predetermined information by getting feature quantities of N dimensions (N being an integer of at least two) by use of a predetermined learner obtained as a result of learning processing and information about a feature quantity for recognition stored in a storage. This program has the steps of: getting a feature quantity matching the feature quantity for recognition of the predetermined feature quantity not greater than N dimensions determined beforehand on the basis of the learner by use of the learner and the feature quantity for recognition stored in the storage; generating a plurality of feature quantity combinations not greater than N dimensions of the feature quantity matching the feature quantity for recognition from the predetermined information by use of the learner and the feature quantity for recognition stored in the storage; getting a registered feature quantity matching each dimension of the plurality of feature quantity combinations; computing a correlation coefficient between the generated plurality of feature quantity combinations and the registered feature quantity matching each dimension of the plurality of feature quantity combinations; and classifying the predetermined information on the basis of the learner by use of the correlation coefficient.

In the above-mentioned first embodiments of the invention, feature quantities of N dimension are obtained from predetermined information and, from the obtained feature quantities of N dimensions, two or more feature quantity combinations not greater than N dimensions are generated, a correlation coefficient between the generated feature quantity combinations and a learning model feature quantity matching each dimension of the feature quantity combinations is computed, thereby executing learning processing for classifying the predetermined information by use of the obtained correlation coefficient.

In the above-mentioned second embodiments of the invention, feature quantities less than N dimensions determined beforehand on the basis of a learner are obtained from predetermined information, two or more feature quantity combinations less than N dimensions are obtained by use of the obtained feature quantities less than N dimensions, and a correlation coefficient between the generated feature quantity combinations and a learning model feature quantity matching each dimension of the feature quantity combinations is obtained, thereby executing learning processing by classifying the predetermined information by use of the obtained correlation coefficient.

In carrying out the invention and according to a third embodiment thereof, there is provided a recognition apparatus capable of getting a feature quantity of N dimensions (N being an integer of at least two) to execute recognition processing for classifying predetermined information. This recognition apparatus has storage means for storing a predetermined learner obtained as a result of learning processing and information about a feature quantity for recognition; combination generating means for getting, from the predetermined information, a feature quantity matching the feature quantity for recognition of the predetermined feature quantity not greater than N dimensions determined beforehand on the basis of the learner by use of the learner and the feature quantity for recognition stored in the storage means to provide a plurality of feature quantity combinations not greater than N dimensions of the feature quantity matching the feature quantity for recognition; and classification processing executing means for computing a correlation coefficient between the plurality of feature quantity combinations generated by the combination generating means and a registered feature quantity matching each dimension of the plurality of feature quantity combinations to classify the predetermined information on the basis of the learner by use of the correlation coefficient.

In the above-mentioned recognition apparatus, the feature quantity for recognition is indicative of a particular local feature quantity at a particular feature point used in the learner.

In the above-mentioned recognition apparatus, the feature quantity combinations not greater than N dimensions determined beforehand on the basis of the learner are the plurality of feature quantity combinations included in a continuous area in a matrix with elements constituting the feature quantity of the N dimensions classified by property.

In the above-mentioned recognition apparatus, the feature quantity is a feature quantity obtained by any of a plurality of Gabor filters.

In the above-mentioned recognition apparatus, the plurality of feature quantity combinations not greater than N dimensions determined beforehand on the basis of the learner are a plurality of combinations in which the feature quantity included in a continuous area in a matrix generated as classified by a filter frequency and a filter direction of the plurality of Gabor filters is combined.

In the above-mentioned recognition apparatus, the plurality of feature quantity combinations not greater than N dimensions determined beforehand on the basis of the learner are a plurality of combinations in which the feature quantity included in a rectangular area for including a filter frequency and a filter direction in a predetermined range in a matrix generated as classifying by a filter frequency and a filter direction of the plurality of Gabor filters.

In the above-mentioned recognition apparatus, the classification processing executing means classifies the predetermined information by use of a boosting algorithm.

In carrying out the invention and according to another third embodiment thereof, there is provided an information recognition method for use in a recognition apparatus having a predetermined learner obtained as a result of learning processing and a storage for storing information about a feature quantity for recognition and capable of getting a feature quantity of N dimensions (N being an integer of at least two) to execute recognition processing for classifying predetermined information. This information recognition method has the steps of getting a feature quantity matching the feature quantity for recognition of the predetermined feature quantity not greater than N dimensions determined beforehand on the basis of the learner by use of the learner and the feature quantity for recognition stored in the storage; generating a plurality of feature quantity combinations not greater than N dimensions of the feature quantity matching the feature quantity for recognition from the predetermined information by use of the learner and the feature quantity for recognition stored in the storage; getting a registered feature quantity matching each dimension of the plurality of feature quantity combinations; computing a correlation coefficient between the generated plurality of feature quantity combinations and the registered feature quantity matching each dimension of the plurality of feature quantity combinations; and classifying the predetermined information on the basis of the learner by use of the correlation coefficient.

In carrying out the invention and according to still another third embodiment thereof, there is provided a program configured to make a computer execute recognition processing for classifying predetermined information by getting feature quantities of N dimensions (N being an integer of at least two)

by use of a predetermined learner obtained as a result of learning processing and information about a feature quantity for recognition stored in a storage. This program has the steps of getting a feature quantity matching the feature quantity for recognition of the predetermined feature quantity not greater than N dimensions determined beforehand on the basis of the learner by use of the learner and the feature quantity for recognition stored in the storage; generating a plurality of feature quantity combinations not greater than N dimensions of the feature quantity matching the feature quantity for recognition from the predetermined information by use of the learner and the feature quantity for recognition stored in the storage; getting a registered feature quantity matching each dimension of the plurality of feature quantity combinations; computing a correlation coefficient between the generated plurality of feature quantity combinations and the registered feature quantity matching each dimension of the plurality of feature quantity combinations; and classifying the predetermined information on the basis of the learner by use of the correlation coefficient.

In the third embodiments of the invention, by use of a predetermined learner obtained as a result of learning processing and the information about feature quantities for recognition, a feature quantity matching the feature quantity for recognition of the predetermined feature quantities not greater than N dimensions predetermined on the basis of a learner is obtained to generate two or more feature quantity combinations not greater than N dimensions of the feature quantities matching the feature quantities for recognition. A registered feature quantity matching each dimension of the generated feature quantity combinations is obtained. A correlation coefficient is computed between the generated feature quantity combinations and the obtained registered feature quantity. Then, the predetermined information is classified by use of the obtained correlation coefficient.

The network is a mechanism in which at least two devices are interconnected so as to transmit information from one device to another. Devices that communicate information via the network may be standalone devices or blocks internal to one unit of device, for example.

The image processing apparatus may be a standalone apparatus or a block configured to execute image processing in an information processing apparatus or a recognition apparatus, for example.

As described and according to one embodiment of the invention, the learning for classification processing can be executed. Especially, the accuracy of classification to be executed as a result of the learning can be significantly enhanced by increasing the number of dimensions of feature quantity but without increasing the number of feature points.

According to other embodiments of the invention, classification processing can be executed. Especially, the accuracy of classification can be significantly enhanced by increasing the number of dimensions of feature quantity but without increasing the number of feature points.

BRIEF DESCRIPTION OF THE DRAWINGS

Other objects and embodiments of the invention will become apparent from the following description of embodiments with reference to the accompanying drawings in which:

FIG. 15 is a flowchart indicative of recognition processing 2; and

FIG. 16 is a block diagram illustrating an exemplary configuration of a personal computer.

DETAILED DESCRIPTION OF THE PREFERRED EMBODIMENTS

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Figure 3:
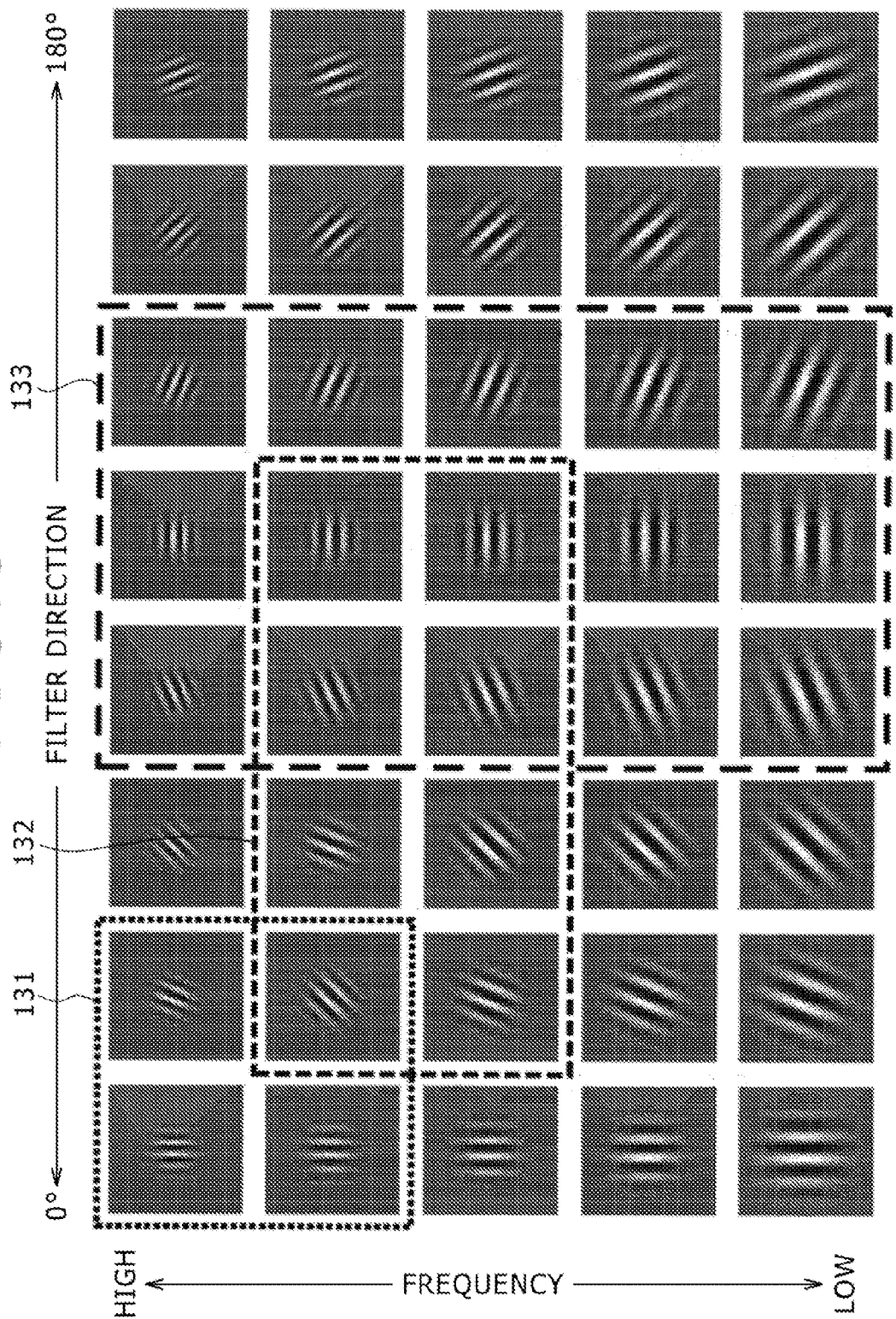
FIG. 3 is a diagram describing an example of combinations.

The information processing apparatus according to a first embodiment of the invention has combination generating means (for example, a local feature calculation block 71 shown in FIG. 1) for getting a first feature quantity of N dimensions (40 dimensions for example) from first information prepared for execution of learning and using the first feature quantity (for example, the feature quantity combinations corresponding to a rectangle 131, a rectangle 132, and rectangle 133 shown in FIG. 3) of N dimensions to generate at least two of first feature quantity combination that are not greater than N dimensions of the first feature quantity; and learning processing executing means (for example, a learner generation block 72 shown in FIG. 1) for computing a correlation coefficient between the plurality of first feature quantity combinations generated by the combination generating means and a learning model feature quantity matching each dimension of the plurality of first feature quantity combinations and, by use of the first correlation coefficient, classifying the first information, thereby executing learning processing for classifying predetermined second information.

The combination generating means generates the plurality of first feature quantity combinations by combining the first feature quantity combination included in an area (the rectangle 131, the rectangle 132, and rectangle 133 shown in FIG. 3) continuous in a matrix with elements constituting the first feature quantity of the N dimensions classified by property (for example, a filter frequency or a filter direction).

Figure 2:
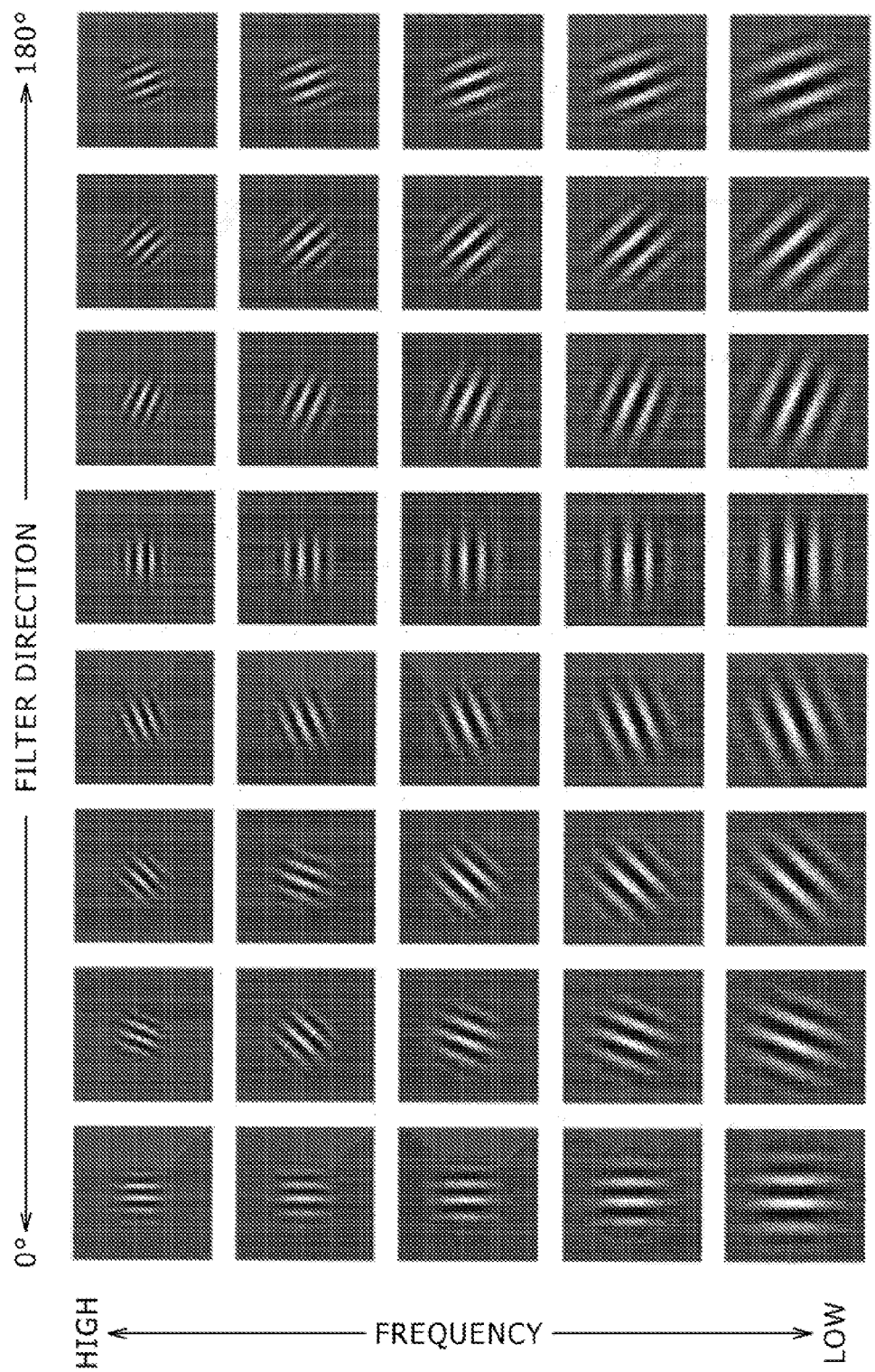
FIG. 2 is a diagram describing a Gabor filter by way of example.

The first feature quantity of the N dimensions is a feature quantity obtained by N Gabor filters (for example, 40 Gabor filters shown in FIG. 2).

The combination generating means generates a plurality of the first feature quantity combinations by combining the first feature quantity included in a area (for example, any of the rectangle 131, the rectangle 132, and rectangle 133 shown in FIG. 3) continuous in a matrix generated as classified by a filter frequency and a filter direction of the N Gabor filters in a feature quantity obtained by the N Gabor filters.

The combination generating means generates a plurality of the first feature quantity combinations by combining the first feature quantity included in a rectangular area (for example, any of the rectangle 131, the rectangle 132, and rectangle 133 shown in FIG. 3) for including a filter frequency and a filter direction in a predetermined range in a matrix generated as classified by a filter frequency and a filter direction of the N Gabor filters in a feature quantity obtained by the N Gabor filters.

In the above-mentioned information processing apparatus, the learning processing executing means executes the learning processing by classifying the first information by use of a boosting algorithm (for example, the Discrete AdaBoost algorithm or the Gentle AdaBoost algorithm).

The combination generating means gets, from the second information, predetermined second feature quantity not greater than N dimensions determined beforehand on the basis of a predetermined learner generated in the learning processing executed by the learning processing executing means, thereby further generating a plurality of second feature quantity combinations not greater than N dimensions of the second feature quantity determined beforehand on the basis of the learner, further having a classification processing executing means (for example, a face recognition block 74 shown in FIG. 1) for computing a second correlation coefficient between the plurality of second feature quantity combinations generated by the combination generating means and a registered feature quantity matching each dimension of the plurality of second feature quantity combinations, thereby classifying the second information by use of the obtained second correlation coefficient and the learner.

The information processing method, according to a first embodiment of the invention, is configured for use in an information processing apparatus for executing learning for classification processing. This information processing methods has the steps of getting a first feature quantity of N dimensions (for example, 40 dimensions) from first information prepared for executing learning (for example, step S34 shown in FIG. 9); generating a plurality of first feature quantity combinations (for example, the feature quantity combinations corresponding to the rectangle 131, the rectangle 132, and the rectangle 133 shown in FIG. 3) that are not greater than N dimensions of the first feature quantity by use of the first feature quantity of N dimensions (for example, step S35 shown in FIG. 9); getting a learning model feature quantity matching each dimension of the plurality of first feature quantity combinations to compute a first correlation coefficient between the plurality of first feature quantity combinations and the learning model feature quantity (for example, step S36 shown in FIG. 9); and classifying predetermined second information by classifying the first information by use of the first correlation coefficient (for example, step S37 shown in FIG. 9 and the processing described with reference to FIG. 10).

Figure 11:
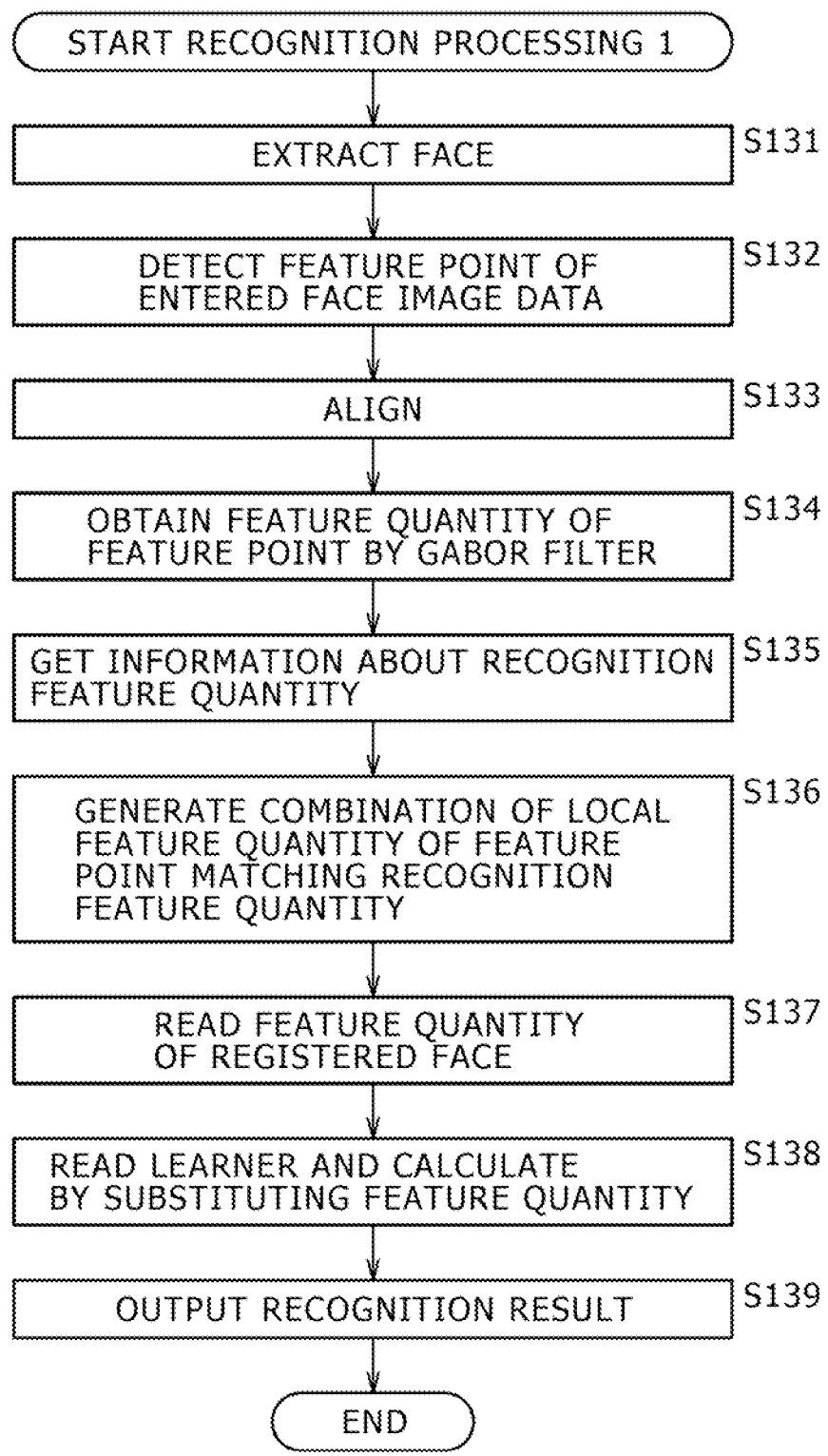
FIG. 11 is a flowchart indicative of recognition processing 1.

The above-mentioned information processing method further has the steps of getting a second feature quantity not greater than N dimensions (for example, 40 dimensions) determined beforehand on the basis of a learner obtained as a result of learning by the learning processing from the second information supplied to be classified by classification processing (for example, step S134 shown in FIG. 11); generating a plurality of second feature quantity combinations (for example, the feature quantity combinations corresponding to the rectangle 131, the rectangle 132, and the rectangle 133 shown in FIG. 3) that are not greater than N dimensions of the second feature quantity determined beforehand on the basis of the learner by use of the second feature quantity not greater than N dimensions (for example, step S136 shown in FIG. 11); getting a registered feature quantity matching each dimension of the plurality of second feature quantity combinations (for example, step S137 shown in FIG. 11); computing a second correlation coefficient between the plurality of second feature quantity combinations and the registered feature quantity; and classifying the second information by use of the learner (for example, L weak learners fjk) obtained as a result of learning by the learning processing and the second correlation coefficient (for example, step S138 shown in FIG. 11).

Figure 9:
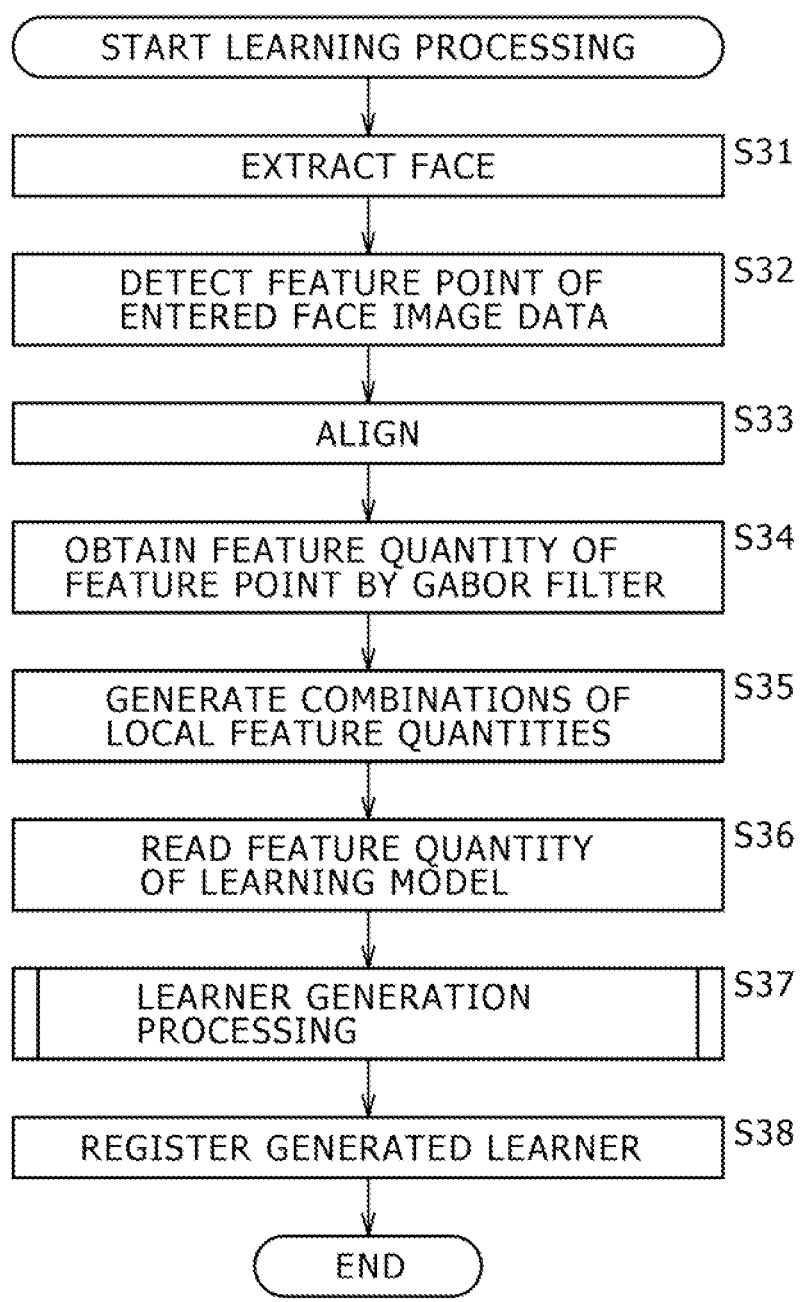
FIG. 9 is a flowchart indicative of learner generation processing.
Figure 10:
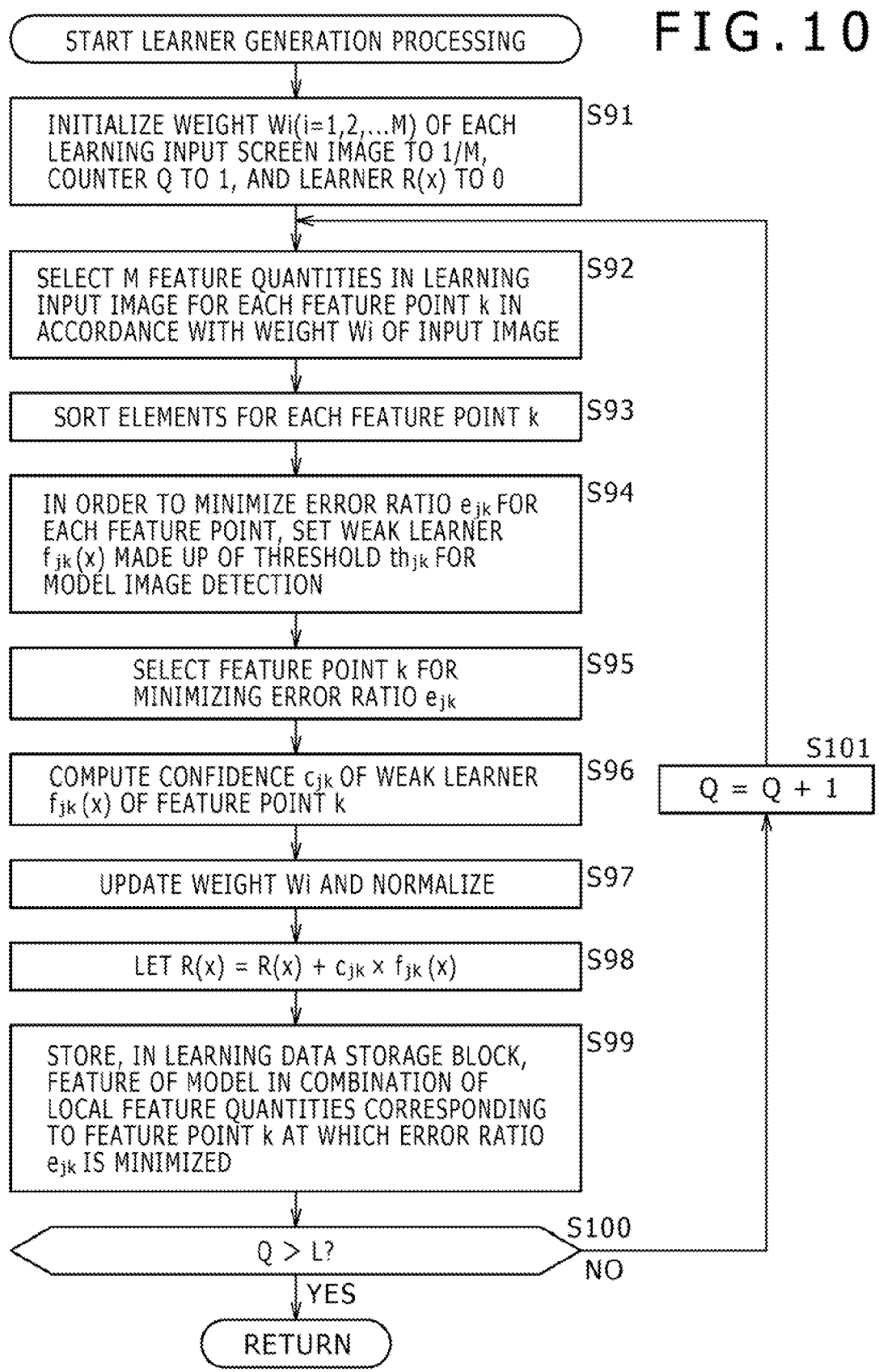
FIG. 10 is a flowchart indicative of learner generation processing.

The program, according to a first embodiment of the invention, has the steps of getting a first feature quantity of N dimensions (for example, 40 dimensions) from first information prepared for execution of learning (for example, step S34 shown in FIG. 9); generating a plurality of first feature quantity combinations (for example, the feature quantity combinations corresponding to the rectangle 131, the rectangle 132, and the rectangle 133 shown in FIG. 3) not greater than N dimensions of the first feature quantity by use of the first feature quantity of N dimensions (for example, step S35 shown in FIG. 9); getting learning model feature quantity matching each dimension of the plurality of first feature quantity combinations to compute a first correlation coefficient between the plurality of first feature quantity combinations and the learning model feature quantity (for example, step S36 shown in FIG. 9); and executing learning processing for classifying predetermined second information by classifying the first information by use of the first correlation coefficient (for example, the processing described with reference to FIG. 10).

The above-mentioned program further has the steps of getting a second feature quantity of not greater than N dimensions (for example, 40 dimensions) predetermined on the basis of a learner obtained as a result of the learning by the learning processing from the second information supplied to be classified by classification processing (for example, step S134 shown in FIG. 11); generating a plurality of second feature quantity combinations (for example, the feature quantity combinations corresponding to the rectangle 131, the rectangle 132, and the rectangle 133 shown in FIG. 3) not greater than N dimensions of the second feature quantity determined beforehand on the basis of the learner by use of the second feature quantity not greater than N dimensions (for example, step S136 shown in FIG. 11); getting a registered feature quantity matching each dimension of the plurality of second feature quantity combinations (for example, step S137 shown in FIG. 11); computing a second correlation coefficient between the plurality of second feature quantity combinations and the registered feature quantity; and classifying the second information by use of the learner (for example, L weak learners fjk) obtained as a result of the learning by the learning processing and the second correlation coefficient (for example, step S138 shown in FIG. 11).

The recognition apparatus, according to a second embodiment of the invention, is capable of getting a feature quantity of N dimensions (N being an integer of at least two) to execute recognition processing for classifying predetermined information by use of a predetermined learner obtained as a result of learning processing. This recognition apparatus has combination generating means for getting, from the predetermined information, the predetermined feature quantity less than N dimensions (for example, 40 dimensions) determined beforehand on the basis of the learner to generate a plurality of feature quantity combinations (for example, the feature quantity combinations corresponding to the rectangle 131, the rectangle 132, and the rectangle 133 shown in FIG. 3) less than N dimensions of the feature quantity determined beforehand on the basis of the learner (for example, a local feature calculation block 71 shown in FIG. 1); and classification processing executing means for computing a correlation coefficient between the plurality of feature quantity combinations generated by the combination generating means and a registered feature quantity (for example, the registered face image data stored in a face registration database 35) matching each dimension of the plurality of feature quantity combinations to classify the predetermined information on the basis of the learner by use of the correlation coefficient (for example, a face recognition block 74 shown in FIG. 1).

In the above-mentioned recognition apparatus, the feature quantity combinations less than N dimensions determined beforehand on the basis of the learner are the plurality of feature quantity combinations included in a continuous area (for example, the rectangle 131, the rectangle 132, or the rectangle 133 shown in FIG. 3) in a matrix with elements constituting the feature quantity of the N dimensions classified by property (for example, a filter frequency or a filter direction).

In the above-mentioned recognition apparatus, the feature quantity is a quantity obtained by any of a plurality of Gabor filters (for example, 40 Gabor filters shown in FIG. 2).

In the above-mentioned recognition apparatus, the plurality of feature quantity combinations less than N dimensions determined beforehand on the basis of the learner are a plurality of combinations in which the feature quantity included in a continuous area (for example, the rectangle 131, the rectangle 132, or the rectangle 133 shown in FIG. 3) in a matrix generated as classified by a filter frequency and a filter direction of the plurality of Gabor filters is combined.

In the above-mentioned recognition apparatus, the plurality of feature quantity combinations less than N dimensions determined beforehand on the basis of the learner are a plurality of combinations in which the feature quantity included in a rectangular area (for example, the rectangle 131, the rectangle 132, or the rectangle 133 shown in FIG. 3) for including a filter frequency and a filter direction in a predetermined range in a matrix generated as classifying by a filter frequency and a filter direction of the plurality of Gabor filters.

In the above-mentioned recognition apparatus, the classification processing executing means classifies the predetermined information by use of a boosting algorithm (for example, the Discrete AdaBoost algorithm or the Gentle Adaboost algorithm).

The information recognition method, according to a second embodiment of the invention, is for use in a recognition apparatus having a predetermined learner obtained as a result of learning processing and a storage for storing information about a feature quantity for recognition and capable of getting a feature quantity of N dimensions (N being an integer of at least two) to execute recognition processing for classifying predetermined information. The above-mentioned information recognition method has the steps of getting a feature quantity matching the feature quantity for recognition of the predetermined feature quantity not greater than N dimensions (for example, 40 dimensions) determined beforehand on the basis of the learner by use of the learner and the feature quantity for recognition stored in the storage (for example, step S134 shown in FIG. 11); generating a plurality of feature quantity combinations (for example, the feature quantity combinations corresponding to the rectangle 131, the rectangle 132, and the rectangle 133 shown in FIG. 3) not greater than N dimensions of the feature quantity matching the feature quantity for recognition from the predetermined information by use of the learner and the feature quantity for recognition stored in the storage (for example, step S136 shown in FIG. 11); getting a registered feature quantity (for example, the registered face image data stored in the face registration database 35) matching each dimension of the plurality of feature quantity combinations (for example, step S137 shown in FIG. 11); computing a correlation coefficient between the generated plurality of feature quantity combinations and the registered feature quantity matching each dimension of the plurality of feature quantity combinations; and classifying the predetermined information on the basis of the learner by use of the correlation coefficient (for example, step S138 shown in FIG. 11).

The program, according to a second embodiment of the invention, is configured to make a computer execute recognition processing for classifying predetermined information by getting feature quantities of N dimensions (N being an integer of at least two) by use of a predetermined learner obtained as a result of learning processing and information about a feature quantity for recognition stored in a storage. This program has the steps of getting a feature quantity matching the feature quantity for recognition of the predetermined feature quantity not greater than N dimensions (for example, 40 dimensions) determined beforehand on the basis of the learner by use of the learner and the feature quantity for recognition stored in the storage (for example, step S134 shown in FIG. 11); generating a plurality of feature quantity combinations (for example, the feature quantity combinations corresponding to the rectangle 131, the rectangle 132, and the rectangle 133 shown in FIG. 3) not greater than N dimensions of the feature quantity matching the feature quantity for recognition from the predetermined information by use of the learner and the feature quantity for recognition stored in the storage (for example, step S136 shown in FIG. 11); getting a registered feature quantity (for example, the registered face image data stored in the face registration database 35) matching each dimension of the plurality of feature quantity combinations (for example, step S137 shown in FIG. 11); computing a correlation coefficient between the generated plurality of feature quantity combinations and the registered feature quantity matching each dimension of the plurality of feature quantity combinations; and classifying the predetermined information on the basis of the learner by use of the correlation coefficient (for example, step S138 shown in FIG. 11).

The recognition apparatus (for example, an image processing apparatus 201 shown in FIG. 14), according to a third embodiment of the invention, is capable of getting a feature quantity of N dimensions (N being an integer of at least two) to execute recognition processing for classifying predetermined information. This recognition apparatus has storage means (for example, a learning data storage block 223 shown in FIG. 14) for storing a predetermined learner obtained as a result of learning processing and information about a feature quantity for recognition; combination generating means (for example, a local feature calculation block 221 shown in FIG. 14) for getting, from the predetermined information, a feature quantity matching the feature quantity for recognition of the predetermined feature quantity not greater than N dimensions (for example, 40 dimensions) determined beforehand on the basis of the learner by use of the learner and the feature quantity for recognition stored in the storage means to provide a plurality of feature quantity combinations not greater than N dimensions of the feature quantity matching the feature quantity for recognition; and classification processing executing means for computing a correlation coefficient between the plurality of feature quantity combinations generated by the combination generating means and a registered feature quantity (for example, the registered face image data stored in the face registration database 35) matching each dimension of the plurality of feature quantity combinations to classify the predetermined information on the basis of the learner by use of the correlation coefficient (for example, a face recognition block 222 shown in FIG. 14).

In the above-mentioned recognition apparatus, the feature quantity combinations not greater than N dimensions determined beforehand on the basis of the learner are the plurality of feature quantity combinations included in a continuous area (the rectangle 131, the rectangle 132, or the rectangle 133 shown in FIG. 3) in a matrix with elements constituting the feature quantity of the N dimensions classified by property (for example, a filter frequency or a filter direction).

In the above-mentioned recognition apparatus, the feature quantity is a feature quantity obtained by any of a plurality of Gabor filters (for example, 40 Gabor filters shown in FIG. 2).

In the above-mentioned recognition apparatus, the plurality of feature quantity combinations not greater than N dimensions determined beforehand on the basis of the learner are a plurality of combinations in which the feature quantity included in a continuous area (for example, rectangle 131, the rectangle 132, or the rectangle 133 shown in FIG. 3) in a matrix generated as classified by a filter frequency and a filter direction of the plurality of Gabor filters is combined.

In the above-mentioned recognition apparatus, the plurality of feature quantity combinations not greater than N dimensions determined beforehand on the basis of the learner are a plurality of combinations in which the feature quantity included in a rectangular area (for example, the rectangle 131, the rectangle 132, or the rectangle 133 shown in FIG. 3) for including a filter frequency and a filter direction in a predetermined range in a matrix generated as classifying by a filter frequency and a filter direction of the plurality of Gabor filters.

In the above-mentioned recognition apparatus, the classification processing executing means classifies the predetermined information by use of a boosting algorithm (for example, the Discrete AdaBoost algorithm or the Gentle AdaBoost algorithm).

The information recognition method, according to a third embodiment of the invention, is for use in a recognition apparatus (for example, the image processing apparatus 201 shown in FIG. 14) having a predetermined learner obtained as a result of learning processing and a storage for storing information about a feature quantity for recognition and capable of getting a feature quantity of N dimensions (N being an integer of at least two) to execute recognition processing for classifying predetermined information. This information recognition method has the steps of getting a feature quantity matching the feature quantity for recognition of the predetermined feature quantity not greater than N dimensions (for example, 40 dimensions) determined beforehand on the basis of the learner by use of the learner and the feature quantity for recognition stored in the storage (for example, step S215 shown in FIG. 15); generating a plurality of feature quantity combinations not greater than N dimensions of the feature quantity matching the feature quantity for recognition from the predetermined information by use of the learner and the feature quantity for recognition stored in the storage (for example, step S216 shown in FIG. 15); getting a registered feature quantity (for example, the registered face image data stored in the face registration database 35) matching each dimension of the plurality of feature quantity combinations (for example, step S217 shown in FIG. 15); computing a correlation coefficient between the generated plurality of feature quantity combinations and the registered feature quantity matching each dimension of the plurality of feature quantity combinations; and classifying the predetermined information on the basis of the learner by use of the correlation coefficient (for example, step S218 shown in FIG. 15).

The program, according to a third embodiment of the invention, is configured to make a computer execute recognition processing for classifying predetermined information by getting feature quantities of N dimensions (N being an integer of at least two) by use of a predetermined learner obtained as a result of learning processing and information about a feature quantity for recognition stored in a storage. This program has the steps of getting a feature quantity matching the feature quantity for recognition of the predetermined feature quantity not greater than N dimensions (for example, 40 dimensions) determined beforehand on the basis of the learner by use of the learner and the feature quantity for recognition stored in the storage (for example, step S215 shown in FIG. 15); generating a plurality of feature quantity combinations not greater than N dimensions of the feature quantity matching the feature quantity for recognition from the predetermined information by use of the learner and the feature quantity for recognition stored in the storage (for example, step S216 shown in FIG. 15); getting a registered feature quantity (for example, the registered face image data stored in the face registration database 35) matching each dimension of the plurality of feature quantity combinations (for example, step S217 shown in FIG. 15); computing a correlation coefficient between the generated plurality of feature quantity combinations and the registered feature quantity matching each dimension of the plurality of feature quantity combinations; and classifying the predetermined information on the basis of the learner by use of the correlation coefficient (for example, step S218 shown in FIG. 15).

The following describes embodiments of the present invention with reference to drawings accompanying thereto.

Figure 1:
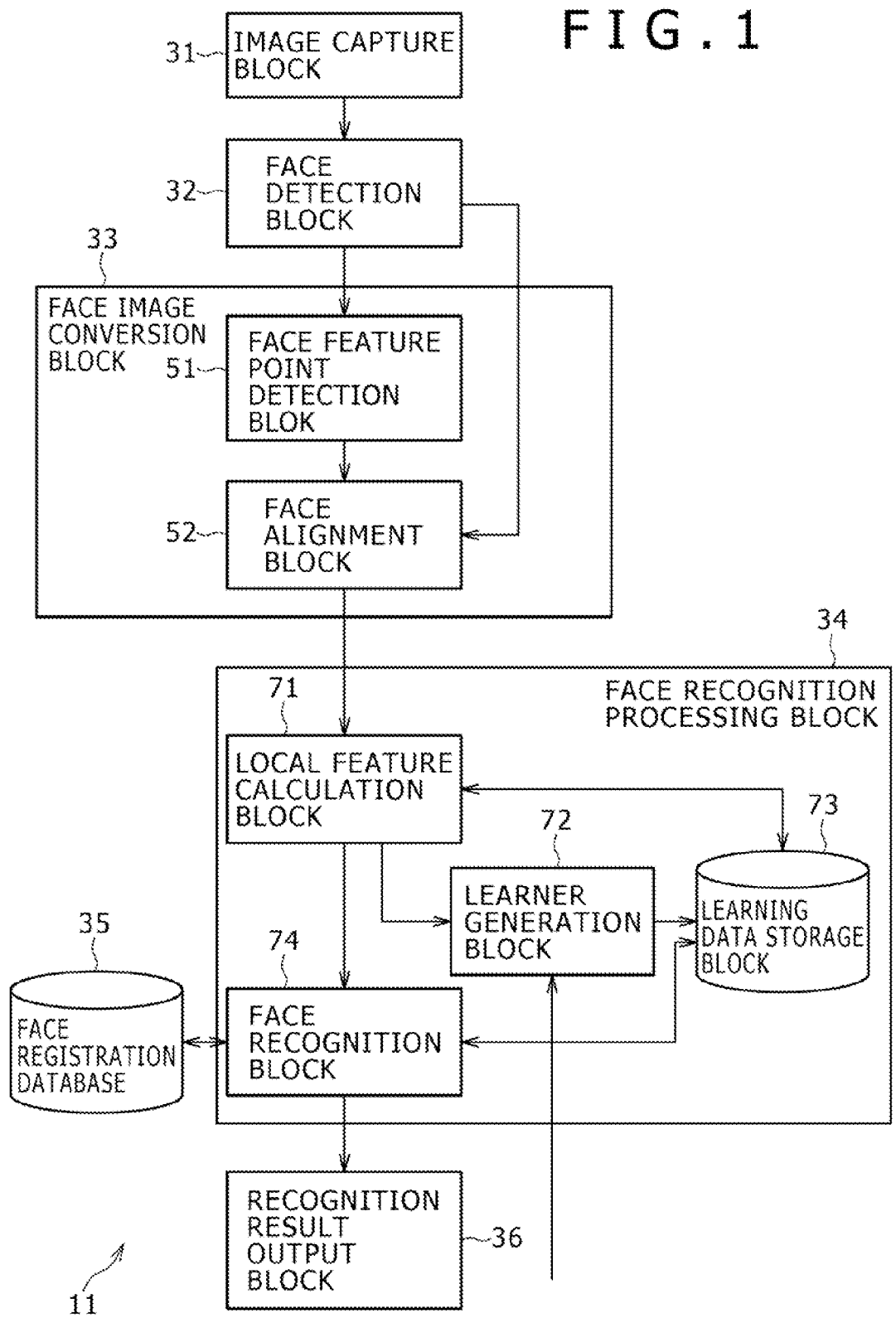
FIG. 1 is a block diagram illustrating an exemplary configuration of an image processing apparatus.

Now, referring to FIG. 1, there is shown a block diagram of an exemplary configuration of an image processing apparatus 11.

The image processing apparatus 11 can execute image recognition processing on a taken image of a person to determine whether that person is a registered person or not.

The image processing apparatus 11 operates in one of two modes, a learning mode and a recognition mode. In the learning mode, recognition processing is learned by use of an image for use in earning so as to generate a learner configured to execute recognition processing in the recognition mode. In the recognition mode, an image is recognized by use of the learner generated in the learning mode to determine whether the image subject to recognition includes the face of a registered person.

The image processing apparatus 11 has an image capture block 31, a face detection block 32, a face image conversion block 33, a face recognition processing block 34, a face registration database 35, and a recognition result output block 36.

It should be noted that the following description will be made assuming that the face registration database 35 be included in the image processing apparatus 11; however, it is also practicable to connect the face registration database 35 to the image processing apparatus 11 via a network, for example. Connecting the face registration database 35 to the image processing apparatus 11 via a network allows two or more image processing apparatuses 11 to share one face registration database 35.

The image capture block 31 is configured to include a camera, for example, thereby capturing a taken image of a person, through the capability of taking images of persons, through an externally arranged camera, or taken from another device having image taking capabilities. An image to be captured by the image capture block 31 at least includes an image of the face of person. The image captured by the image capture block 31 is supplied to the face detection block 32.

In the learning mode, the image capture block 31 captures two or more images for learning of a particular person that are different in the size and direction of a face being taken and, at the same time, two or more images that do not include the image of the face of that person. It should be noted that the feature quantity at predetermined feature points of an image of the front face of that person is used for the purpose of learning as a learning model feature quantity in learning processing.

Further, in the recognition mode, the image capture block 31 captures a taken image including the person's face subject to recognition.

The face detection block 32 analyzes the image supplied from the image capture block 31 to extract the face (or the position and size thereof) of person, thereby detecting the extracted image of person (hereafter referred to as a face image). The image supplied from the image capture block 31 is an image including the user's face subject to recognition; sometimes, however, the image is not of a face but a whole body of person. The face detection block 32 determines an area of the face of person from such an image to extract the image corresponding to the face of person. The extracted face image is supplied to a face feature point detection block 51 and a face alignment block 52 of the face image conversion block 33.

The face image conversion block 33 has the face feature point detection block 51 and the face alignment block 52.

From the face image supplied from the face detection block 32, the face feature point detection block 51 detects a feature point for alignment for use in morphing processing by the face alignment block 52 to be described later. This alignment feature point may be a part forming a feature in the person's face, such as an eye, a nose, or a mouth, for example, namely, a face feature part. Alternatively, the face feature point detection block 51 may detect a feature point that is more detail than face feature parts.

The face feature point detection block 51 can detect a feature position by applying a technique, such as AAM (Active Appearance Models), for example.

The face alignment block 52 analyzes the face image supplied from the face detection block 32 and the alignment feature point detected by the face feature point detection block 51 to detect direction in which the extracted face is directed, thereby executing morphing processing, such as affine transformation, so as to put the face feature position to a reference position. Consequently, if this image is found to be the image of a face viewed from the front, morphine processing is executed such that both the eyes are horizontally positioned as separated by a predetermined distance, the nose is positioned below the mid point between both the eyes, and the mouth comes below the nose. If the face image supplied from the face detection block 32 is not directed in the front, that face image is transformed in substantially the same manner as the front face image.

The face recognition processing block 34 has a local feature calculation block 71, a learner generation block 72, a learning data storage block 73, and a face recognition block 74.

The face image with the extracted feature point corrected to the reference position is supplied to the local feature calculation block 71 of the face recognition processing block 34. The local feature calculation block 71 calculates the local feature quantities in two or more feature points of the supplied face image. The feature point of which local feature quantity is obtained may be the same as the alignment feature point detected by the face feature point detection block 51 or may be two or more different points (for example, points indicated by crosses shown in FIG. 7 to be described later) which are entirely different from the alignment feature points detected by the face feature point detection block 51. The local feature calculation block 71 is made up of a Gabor filter.

The following describes the processing to be executed by a Gabor filter, namely, Gabor filtering.

It is known that some of human visual cells having selectivity in a particular direction. These cells are made up of cells that react along the vertical line and others that react along the horizontal line. As with these cells, the Gabor filter is a space filter made up of two or more filters having directional selectivity.

The Gabor filter is spatially expressed in the Gabor function. As shown equation (1) below, Gabor function $g(x, y)$ is composed of carrier $s(x, y)$ composed of a cosine component and two-dimensional Gaussian analytical envelope $Wr(x, y)$.

$$g(x,y)=s(x,y)w_r(x,y) \quad (1)$$

Carrier $s(x, y)$ is expressed as shown in equation (2) below by use of an exponential function. In this equation, coordinate values (u0, v0) are indicative of a space frequency and P is indicative of a phase of cosine component.

$$s(x,y)=\exp(j(2\pi(u_0 x+v_0 y)+P)) \quad (2)$$

The carrier shown in equation (2) above can be separated into real-number component $Re(s(x, y))$ and imaginary-number component $Im(s(x, y))$ as shown in equation (3) below.

$$Re(s(x,y))=\cos(2\pi(u_0 x+v_0 y)+P)$$

$$Im(s(x,y))=\sin(2\pi(u_0 x+v_0 y)+P) \quad (3)$$

On the other hand, the envelope made up of two-dimensional Gaussian distribution is expressed as shown in equation (4) below.

$$w_r(x,y)=k\exp(-\pi(a^2(x-x_0)_r^2+b^2(y-y_0)_r^2)) \quad (4)$$

In equation (4) above, coordinate axis (x0, y0) is a peak of this function and constants a and b are Gaussian distribution scale parameters. Suffix r is indicative of a rotary operation as shown in equation (5) below.

$$(x-x_0)_r = (x-x_0)\cos\theta + (y-y_0)\sin\theta$$

$$(y-y_0)_r = -(x-x_0)\sin\theta + (y-y_0)\cos\theta \qquad (5)$$

Therefore, from equations (2) and (4) above, the Gabor filter is expressed in a space function as shown in equation (6) below.

$$g(x,y) = k\exp(-\pi(a^2(x-x_0)_r^2 + b^2(y-y_0)_r^2))\exp(j(2\pi(u_0 x + v_0 y) + P)) \qquad (6)$$

The local feature calculation block 71 calculates feature quantities by use of two or more Gabor filters having different directions and frequencies. The local feature calculation block 71 is assumed here to use eight directions and five frequencies and therefore 40 Gabor filters, thereby executing the processing of calculating the feature quantity of each feature point.

FIG. 2 shows an example in which 40 Gabor filters are arranged on the basis of scale and direction. In FIG. 2, the vertical axis is indicative of the variation in frequency direction, in which the frequency increases in the upper portion while the frequency decreases in the lower portion. In the figure, the horizontal axis is indicative of the variation in filter direction (or filter angle), in which the left end corresponds to 0 degree and the angle increases as it goes to the right side. The center portion corresponds to 90 degrees and the right end corresponds to an angle that is most near to 180 degrees. Namely, in the arrangement shown in FIG. 2, the filters in the leftmost column and the filters in the rightmost column are continuous to each other as the variation in angle.

The response of the Gabor filter is expressed in an equation below with Gi being ith Gabor filter, Gabor feature of ith Gabor filter being Ji, and input image being I:

$$j_i(x,y) = G_i(x,y) \otimes I(x,y) \qquad (7)$$

Namely, if 40 Gabor filters are used for one feature point, 40 feature quantities are obtained. In other words, for one feature point, a feature quantity vector having 40 parameters is obtained.

The feature quantity obtained by the local feature calculation block 71 is supplied to the learner generation block 72 in the learning mode and to the face recognition block 74 in the face recognition mode.

For Gabor jets constituting each feature vector, ones having various frequency and direction parameters are prepared. In the Gabor filtering in the past, many of these parameters are common at all feature points.

However, in obtaining an image feature, especially, when obtaining the feature of a face image, it is possible that there is an unnecessary parameter at each feature point because the frequency and direction parameters necessary for describing features differ from one feature point position to another.

And it is highly possible for a Gabor feature obtained from unnecessary parameters as described above to take a value that is not correlated with the local feature of that feature point in general, so that, in obtaining a correlation coefficient between local feature vectors including these values, an adverse effect may be given to a result to be achieved.

If the local feature of a particular feature point is represented by two or more mutually independent factors (expression, personality, and eyeglasses, for example), the independent correlation between these factors cannot be evaluated from the correlated value between local feature vectors constituted by all Gabor jets.

As described above, the local feature calculation block 71 employs eight directions and five frequencies and uses 40 Gabor filters to calculate the feature quantity of each feature point.

Therefore, in the learning mode, the local feature calculation block 71 generates two or more combinations of feature vectors of multiple dimensions including at least a part of the feature quantities to be obtained by the 40 Gabor filters, as the local feature quantity at each feature point.

Obviously, these combinations may or may not contain a combination including all the feature quantities obtained by the 40 Gabor filters, namely, the 40-dimensional feature vectors.

In other words, the local feature calculation block 71 can get two or more feature quantity vectors having less than 40 parameters for one feature point. Namely, if local feature quantities at N feature points are calculated for one face image, preparing P types of Gabor filter combinations allows the acquisition of P types of feature vectors for one feature point, thereby obtaining N×P feature quantity vectors for one face image.

Total possible number T of these local feature quantity combinations will be number indicated by equation (8) below.

$$T = \sum_n {}_{40}C_n \qquad (8)$$

Thus, the local feature calculation block 71 combines, as a local feature quantity, a part of the feature quantities obtained through the 40 Gabor filters. From among these combinations, random combinations may be selected for use as local feature quantities. It should be noted that, as shown in equation (8) above, the total number T of combinations becomes a very large value.

As described above, in obtaining an image feature, especially, when obtaining the feature of a face image, it is possible that there is an unnecessary parameter at each feature point because the frequency and direction parameters necessary for describing features differ from one feature point position to another. It can be assumed that the parameters not unnecessary, namely, the frequency band and direction necessary for each feature point be inside a continuous range. Therefore, it is preferable to determine combinations of local feature quantities by selecting rectangular areas having given position and given size, such as a rectangle 131, a rectangle 132, and a rectangle 133 shown in FIG. 3, from the feature dimensions as shown in FIG. 2 in which all Gabor filters are arranged for each scale and direction, for example.

Thus, if a rectangular area having given position and given size is selected from the feature dimensions with Gabor filters arranged for each scale and direction, the number of combinations will be 5C2×8P2=560 at most, thereby enabling the selection of feature dimensions by a rational quantity. If the necessary frequency band and direction for each feature point are inside a rectangular area selected as combinations, in other words, if the necessary frequency band and direction are not included in the rectangular area of the Gabor feature not correlated with local feature, the non-correlated feature quantity can be prevented from giving an adverse effect.

In the learning mode, the local feature calculation block 71 supplies two or more feature quantity vectors having less than 40 parameters at each feature point to the learner generation block 72. Also, in the recognition mode, the local feature calculation block 71 calculates the local feature quantity corresponding to the corresponding feature point on the basis of the recognition feature quantities (or recognition feature quantities) stored in the learning data storage block 73 and supplies the obtained local feature quantity to the face recognition block 74. The feature quantity for recognition denotes the information indicative of the local feature quantity (the particular portion of the Gabor filter) of a particular feature point that is used in the learner generated by learning in the learner generation block 72.

Consequently, the generating of a learner and the calculating of a correlation coefficient to be executed at the time of face recognition not only for one type of correlation coefficient based on the feature quantity vector using all dimensions, but also for two or more correlation coefficients including the feature quantity vector using a part of dimensions. In other words, two or more feature quantities having different dimensions can be used for learning and recognition.

In the learning mode, the learner generation block 72 executes statistical learning processing based on AdaBoost by use of the feature quantity of the learning image computed by the local feature calculation block 71 and the feature quantity of a learning model stored in advance to generate a learner for use in the recognition processing in the recognition mode, storing the generated learner and the information (the correlation value and the information indicative of the assurance of this learner) about this learner into the learning data storage block 73. In addition, in the process of the learning of the learner, the learner generation block 72 extracts only the model feature quantity that gives a great influence in the recognition of a target face image and supplies the extracted model feature quantity to the learning data storage block 73 for storage as the feature quantity for recognition that is the information indicative of a particular local feature quantity (or a particular rectangle area portion) of a particular feature point.

AdaBoost denotes a theory in which a "strong learner" can be constructed by many combinations of "learners slightly weaker than random (also referred as a weak learner), proposed by Freund, et. al. in 1996. The learners generated by the learner generation block 72 are this "learner slightly weaker than random" (hereafter referred to also as a weak learner), in which each learner is generated such that a recognition at which the learners generated before that learner are not good is weighted.

Then, in the recognition processing, the confidence is obtained depending on how reliable each weak learner is, on the basis of which majority decision is made.

The learner generation block 72 will be detailed later with reference to FIG. 6.

The learning data storage block 73 stores the learners generated by the learner generation block 72, the information about these learners, and the recognition feature quantities.

In the recognition mode, the face recognition block 74 makes a comparison between the feature quantity calculated by the local feature calculation block 71 and the registered face image data stored in the face registration database 35 by use of the learner stored in the learning data storage block 73, namely, obtains a correlation coefficient to determine whether there is a match with a registered person, supplying a decision result to the recognition result output block 36. Namely, on the basis of the confidence of the learner stored in the learning data storage block 73, the face recognition block 74 makes a majority decision to determine whether a match is found with a registered person.

The face registration database 35 stores the information about the feature quantities necessary for the recognition of registered persons. Namely, the face registration database 35 may store all the Gabor jets at all feature points of the face images of registered persons, but the face registration database 35 may only store at least the feature quantities corresponding to the recognition feature quantities.

The data (or the registered face image data) of the feature quantities registered in the face registration database 35 may be obtained and registered as a result of the execution of the processing by the image capture block 31 through the local feature calculation block 71 shown in FIG. 1 or the data that is externally obtained and registered as far as this data is similar to the data that is obtained as a result of the execution of the processing by the image capture block 31 through the local feature calculation block 71.

The recognition result output block 36 externally gives the decision result supplied by the face recognition block 74, in the form of buzzer sound, text display, or LED indication, for example, or outputs the decision result itself to external devices, for example. To be more specific, the recognition result output block 36 may be configured including a display monitor, for example, thereby displaying the decision result in the form of a message, for example.

If a registered face image matching the face image included in the entered image is registered in the face registration database 35, for example, the information such as the name of a person associated with the registered face image found matching can be read from the face registration database 35, thereby outputting this information to the recognition result output block 36 as a decision result.

If the registered face image matching the face image included in the entered image is not registered in the face registration database 35, then the information indicative that the registered face image is not stored, for example, a message "Unregistered person", can be outputted as a decision result to the recognition result output block 36.

Thus, by making a comparison between feature quantities, the image processing apparatus 11 identifies if the obtained face image of person matches a registered face image of person.

The following describes general AdaBoost processing before the detail description of the capabilities of the learner generation block 72.

In a configuration in which a feature quantity is obtained for each of N (N is a positive integer) feature points of one image for learning, a correlation coefficient between the feature quantity of each feature point and N learning model feature quantities is obtained in learning processing.

Generally, if M (M is a positive integer) learning images are used to generate a learner by use of AdaBoost, a correlation coefficient between N feature quantities for each of M learning images and N model feature quantities corresponding to the N feature quantities is obtained as the feature quantities for generating a learner. In other words, for each of M learning images, a correlation vector of N dimensions with the correlation coefficients, as parameters, obtained for each of N model feature quantities is generated as a feature quantity parameter for each feature point.

The following describes a particular example of generating a learner in which, of the M learning images, learning images PI1 and PI2 are images including a target object of recognition and learning images PI3 through PIM are images not including a target object of recognition, for example.

Figure 4:
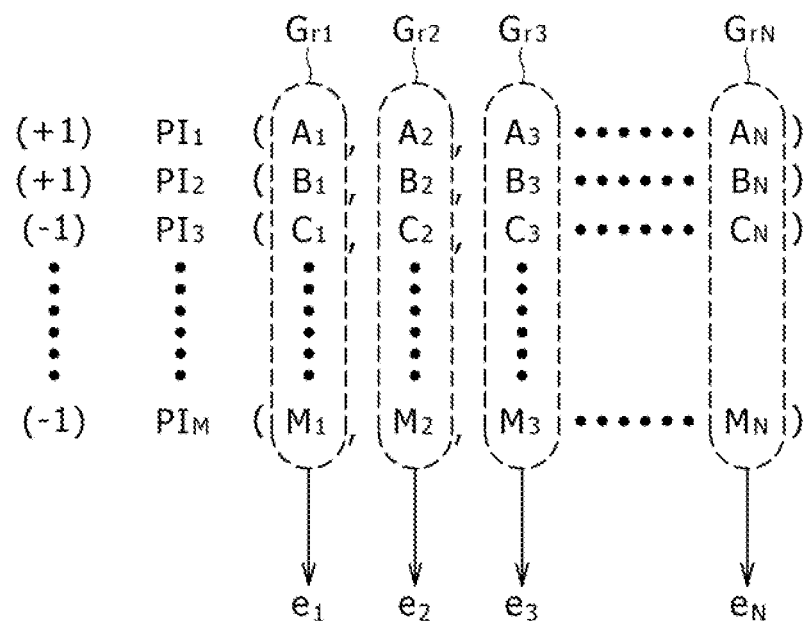
FIG. 4 is a diagram illustrating boosting processing by way of example.

FIG. 4 shows N-dimensional vectors using correlation coefficients as parameters, namely, the feature quantities for use in generating a learner that are obtained when learning images PI1 and PI2 are images including a target object of recognition and learning images PI3 through PIM are images not including a target object of recognition. In FIG. 4, the images including a target object of recognition are indicated with "+1" while the images not including a target object of recognition is indicated with "−1".

As shown in FIG. 4, if the feature quantities of the feature points are supplied with learning image PI1 being (A1, A2, ... AN), with learning image PI2 being (B1, B2, ... BN), with learning mage PI3 being (C1, C2, ... CN), with learning image PIM being (M1, M2, ... MN), and so on, the feature quantity at feature point k=1 is (A1, B1, C1, ... M1) indicated by group Gr1, the feature quantity at feature point k=2 is (A2, B2, C2, ... M2) indicated by group Gr2, and the feature quantity at feature point k=N is (AN, BN, CN, ... MN) indicated by group GrN. Namely, for each of N feature points, group Grk of M feature quantities for each of the N feature points is set for each of learning images P10.

Then, M feature quantities are extracted by drawing at feature points in accordance with the weight set to each learning image PIi. In the first processing, the weights Wi are equal to each other, so that, when M feature quantities are drawn, all feature quantities are selected statistically. Therefore, in the first processing, it is assumed that all feature quantities be selected at feature points k. Obviously, in actual cases, the same feature quantity may be selected duplicately.

Next, M input feature quantities obtained by sampling N input feature quantities are sorted in the ascending order of powers or the descending order of powers. Then, on the basis of the errata information indicative whether the learning image with input feature quantities extracted includes a target object of recognition, namely, on the basis of (+1) or (−1) shown in FIG. 4, if a certain threshold is set for each of the N input feature quantities sorted in the ascending order of powers or the descending order of powers, error ratios are calculated by varying the threshold whether the true and the error are correctly separated around the threshold, thereby executing threshold setting so as to minimize the error ratio. This threshold is set as the weak learner.

Figure 5:
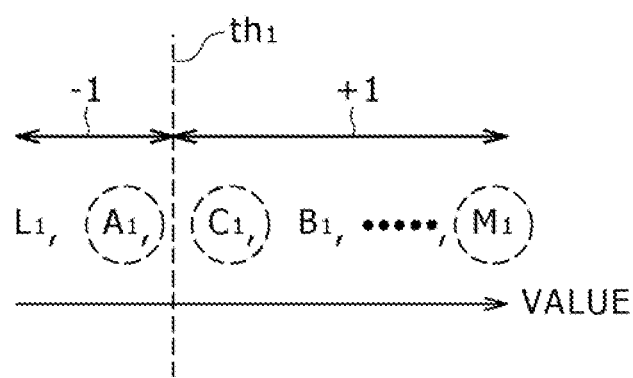
FIG. 5 is another diagram illustrating boosting processing by way of processing.

To be more specific, assume that the M feature quantities corresponding to feature point k=1 be arranged in the ascending order of powers or the descending order of powers as L1, A1, C1, B1, ... M1 as shown in FIG. 5 and there be no target object of recognition in a range below the threshold and there be a target object of recognition in a range above the threshold, then, if threshold th1 is set between feature quantities A1 and C1, feature quantity A1 enclosed with a dashed line as shown in the figure is the feature quantity of the learning image including a target object of recognition, while feature quantity C1 and feature quantity M1 are the feature quantities of the learning image including no target object of recognition, thereby causing an error.

Thus, on the basis of the errata information (or the information indicative whether a target object of recognition is included or not) of the learning image, weight Wi of the learning image with the feature quantity regarded as an error extracted is added to calculate an error ratio, thereby selecting a weak learner minimizing the error ratio among N weak learners.

The following describes a configuration and an operation of the learner generation block 72 of the face recognition processing block 34.

Figure 6:
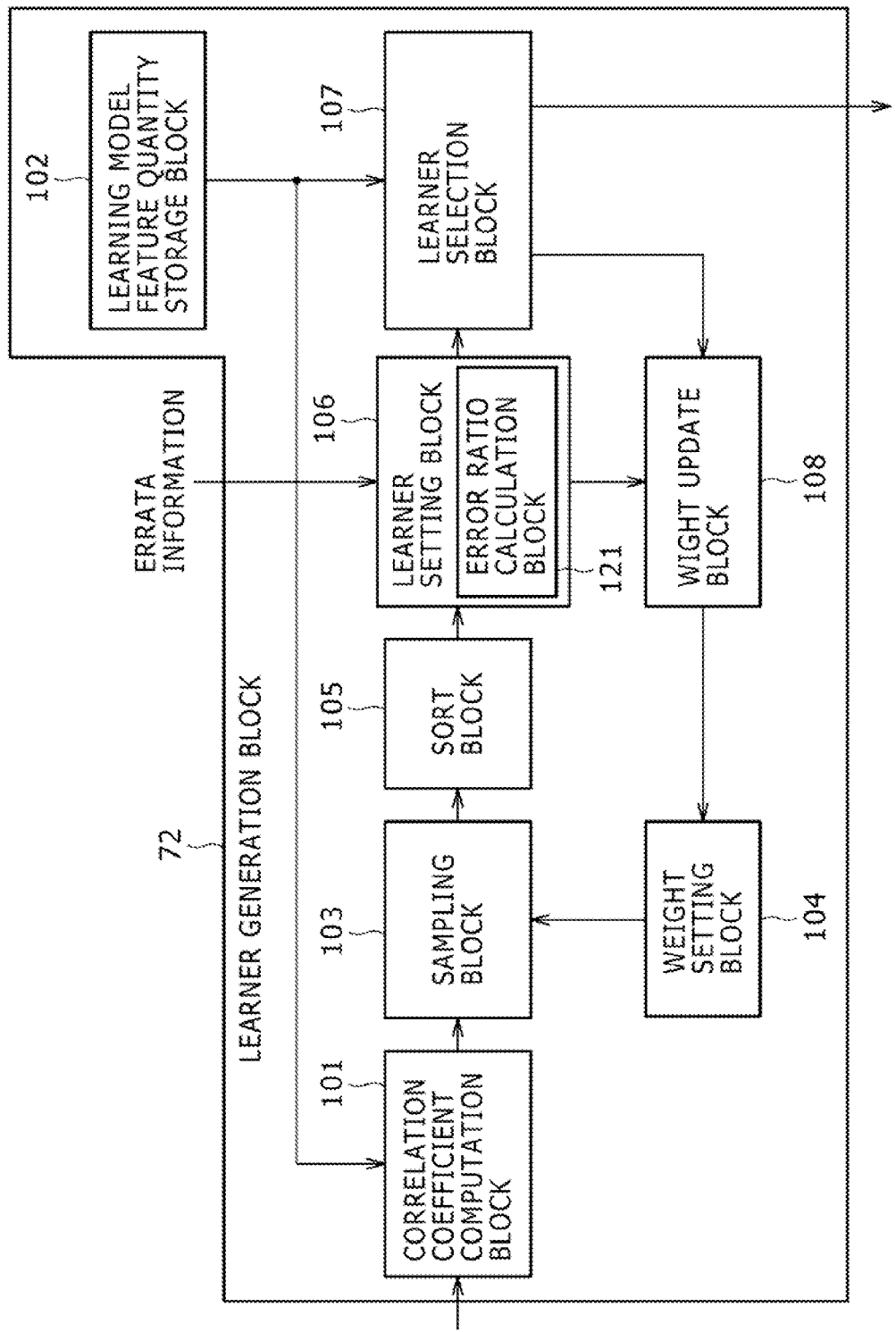
FIG. 6 is a block diagram illustrating an exemplary configuration of a learner generation block shown in FIG. 1.

FIG. 6 shows a block diagram illustrating an exemplary configuration of the learner generation block 72.

The learner generation block 72 has a correlation coefficient computation block 101, a learning model feature quantity storage block 102, a sampling block 103, a weight setting block 104, a sort block 105, a learner setting block 106, a learner selection block 107, and a weight update block 108.

Figure 7:
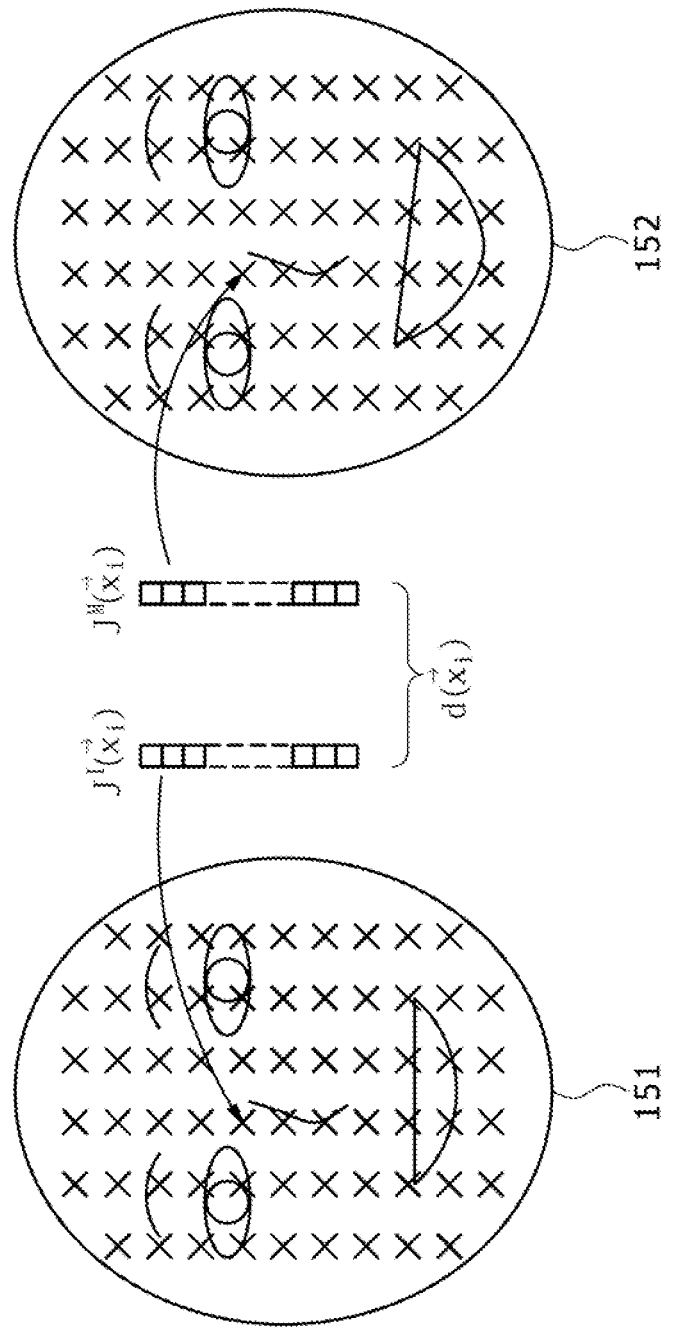
FIG. 7 is a diagram describing the computation of correlation coefficients at the time of learning.

As shown in FIG. 7, the correlation coefficient computation block 101 computes, in a learning image 151 and a learning model image 152 stored in the learning model feature quantity storage block 102, a correlation coefficient between local feature vectors made up of Gabor features of combinations of corresponding local feature quantities of a corresponding feature point. Namely, the correlation coefficient computation block 101 computes different correlation coefficients of two or more dimensions at one feature point.

To be more specific, at one feature point, the correlation coefficient computation block 101 can compute two or more correlation coefficients in combinations of local feature quantities having different dimensions, such as 8 dimensions, 9 dimensions, 12 dimensions, and 16 dimensions, for example, and, at the same time, even in the case of the same number of dimensions, can compute two or more correlation coefficients for the feature quantity vector made up of local feature quantities obtained by the combinations of local feature quantities in different areas, in other words, the combinations of different Gabor filters.

The learning model feature quantity storage block 102 stores Gabor jets held by the learning model image 152 shown in FIG. 7 at each feature point.

As described above, the local feature calculation block 71 generates two or more feature vectors in which local feature quantities of two or more dimensions including at least a part of the feature quantities obtained by the 40 Gabor filters. If P types of combinations are generated here for example, the correlation coefficient computation block 101, in obtaining correlation vectors by use of the feature quantities of N feature points, does not generate N dimensional vectors with all dimensions of the two local feature vectors of learning image and model feature quantity used as parameters as with the case where a general AdaBoost is used as described before with reference to FIG. 4, but can generate feature vectors of N×P dimensions by including also the correlation coefficients using only some dimensions as parameters.

Namely, by use of two or more combinations of at least some of all dimensions, the number of dimensions of the boosting processing can be increased without increasing the number of face image feature points and without increasing the processing amount of the filtering based on the Gabor filter.

Especially, in the case of a face image, the frequencies and direction parameters necessary for writing each feature depend on the position of each feature point, so that it is possible for each feature point to have unnecessary parameters of the feature quantities obtained by the 40 Gabor filters. Therefore, the performance of a learner obtained as a result of the learning based on each of the two or more combinations generated as the local feature quantities that are combinations of feature vectors of two or more dimensions including at least a part of the feature quantities obtained by the 40 Gabor filters may be higher than the performance provided by the related-art. At this moment, it is preferable to determine the combinations of local feature quantities by selecting rectangular areas of given position and size, such as the rectangle 131, the rectangle 132, and the rectangle 133 described before with reference to FIG. 3 for example from the feature dimensions shown in FIG. 2 in which all Gabor filters are arranged in scale and direction, in other words, by selecting combinations of the Gabor filters in which frequency and direction properties are continuous.

Figure 8:
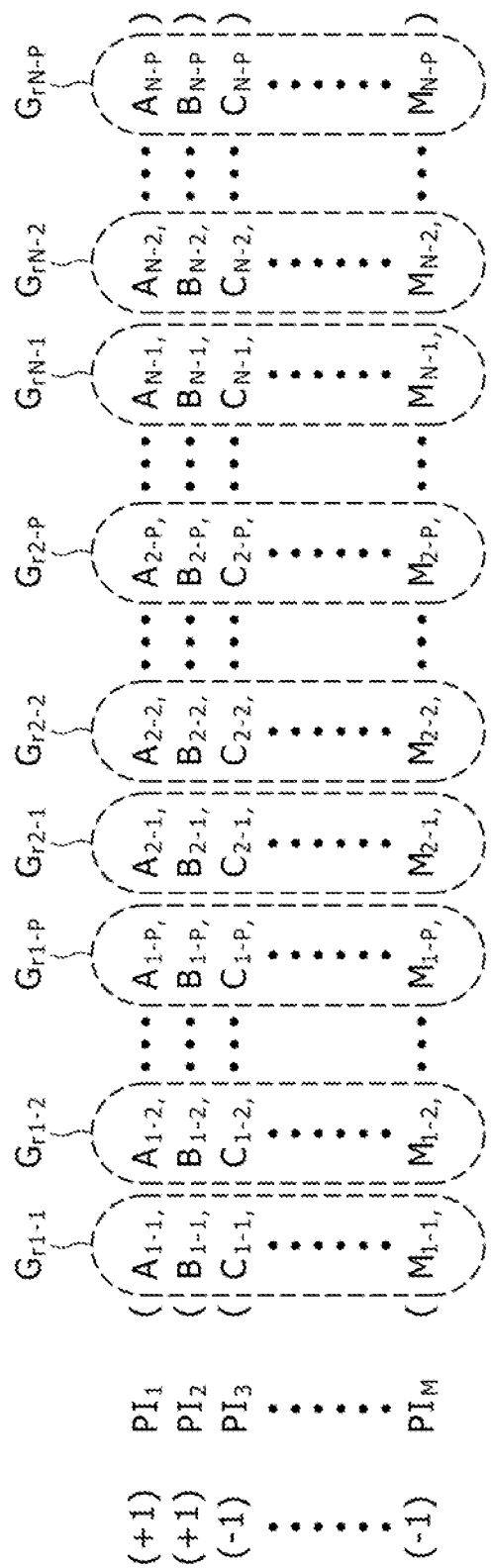
FIG. 8 is a diagram describing feature quantities for use in boosting processing.

For example, if M learning images are supplied, P combinations of local feature quantities are calculated at one feature point by the local feature calculation block 71, and, at each of N feature points, a correlation coefficient is computed for each of corresponding P combinations by the correlation coefficient computation block 101, then the feature quantities to be supplied from the correlation coefficient computation block 101 to the sampling block 103 will be as shown in FIG. 8.

Namely, N×P feature quantities are supplied from the correlation coefficient computation block 101 to the sampling block 103 as (A1-1, A1-2, ... A1-$p$, A2-1, A2-2, ... A2-$p$, ... AN-1, AN-2, ... AN-p) for learning image PI1. Likewise, the feature quantities at each feature point are supplied from the correlation coefficient computation block 101 to the sampling block 103 as (B1-1, B1-2, ... B1-$p$, B2-1, B2-2, ... B2-$p$, ... BN-1, BN-2, ... BN-p) for learning image PI2, (C1-1, C1-2, ... C1-$p$, C2-1, C2-2, ... C2-$p$, ... CN-1, CN-2, ... CN-p) for learning image PI3, and (M1-1, M1-2, ... M1-$p$, M2-1, M2-2, ... M2-$p$, ... MN-1, MN-2, ... MN-p) for learning image PIM.

Therefore, the feature quantity in combinations of the first local feature quantity of feature point k=1 is (A1-1, B1-1, C1-1, ... M1-1) indicated by group Gr1-1. The feature quantity in combinations of the second local feature quantity of feature point k=1 is (A1-2, B1-2, C1-2, ... M1-2) indicated by group Gr1-2. Likewise, the feature quantity in combinations of the Pth local feature quantity of feature point k=1 is (AN-P, BN-P, CN-P, ... MN-P) indicated by group GrN-P. Namely, a group of M feature quantities is set for each learning image PIi for the combination of P types of local feature quantities for each of N feature points.

The sampling block 103 samples M input feature quantities for each model feature quantity (namely, for each parameter) in accordance with the weight in the learning image unit set by the weight setting block 104 and supplies a result of the sampling to the sort block 105.

To be more specific, the sampling block 103 extracts feature quantities by M-unit drawing for each combination of local feature quantities at each feature point, namely, for each vertical group shown in FIG. 8 in accordance with the weight set to each learning image PIi. In the first processing, all weights Wi are equal, so that, when M feature quantities are extracted, all feature quantities will be selected in terms of statistics. Therefore, it is assumed here that, in the first processing, all feature quantities be selected in each combination of each feature point k. Obviously, the same feature quantity may be duplicately selected in actual cases.

The sort block 105 sorts the M input feature quantities obtained by sampling each of N×P input feature quantities in the ascending order of powers or the descending order of powers and supplies a result of the sorting to the learner setting block 106.

On the basis of the errata information indicative whether the learning image with input feature quantities extracted includes a target object of recognition, the learner setting block 106 controls, while changing thresholds, an error ratio calculation block 121 to calculate an error ratio for each of the N×P input feature quantities sorted in the ascending order of powers or the descending order of powers, thereby setting a threshold so as to minimize the error ratio (this threshold is set as a weak learner).

To be more specific, on the basis of the information indicative whether the learning image with input feature quantities extracted includes a target object of recognition, the learner setting block 106 controls the error ratio calculation block 121, while changing threshold values, for each of M feature quantities for each combination of local feature quantities at each feature point, to calculate error ratio ejk as shown in equation (9) below, thereby setting a threshold so as to minimize error ratio ejk. In what follows, suffix k denotes the suffixed feature point is the k-th feature point among N feature points and suffix j denotes the suffixed combination of local feature quantities is j-th combination among P combinations. Here, threshold thjk for each combination of local feature quantities at each feature point provides one weak learner fjk. Therefore, the learner setting block 106 supplies error ratio ejk for each weak learner for the learner selection block 107. Namely, N×P weak learners fjk in accordance with N×P feature quantities are set for each combination of local feature quantities at each feature point and error rat-o ejk is obtained for each of N×P (namely, for each weak learner fjk). It should be noted that weak learner fjk is a function that outputs "+1" if a target object of recognition is included and "−1" if a target object of recognition is not included.

Namely, like the case described with reference to FIG. 5, if the feature quantities (or the obtained correlation coefficients) corresponding to a certain combination of feature quantities at a certain feature point are arranged in the ascending order of powers or the descending order of powers, the decision of an error or no error is made on the basis which side of the set threshold thjk the feature quantities corresponding to the learning image including a target object of recognition and the feature quantities corresponding to the learning image not including a target object of recognition are located.

As shown in equation (9) below, on the basis of the errata information (namely, the information indicative whether a target object of recognition is included or not) of the learning image, the error ratio calculation block 121 adds the weights Wi of the learning images with the feature quantities regarded as error extracted, thereby calculating error ratio ejk.

$$e_{jk} = E_w[1_{(y \neq f_{jk})}] \quad (9)$$

In equation (9) above, y≠fjk denotes a condition of error feature point k and Ew denotes that the weight at error-causing feature point k is added.

Then, the learner setting block 106 supplies error ratio ejk for each weak learner to the learner selection block 107. Namely, N×P weak learners corresponding to N×P input feature quantities are set to obtain an error ratio for each of N×P.

Of N×P weak learners fjk, the learner selection block 107 selects weak learner fjk that minimizes error ratio ejk.

Of N×P weak learners fjk, the learner selection block 107 selects weak learner fjk that minimizes error ratio ejk and stores the selected weak learner into the learning data storage block 73 and reads the model feature quantities corresponding to the selected weak learner fjk from the learning model feature quantity storage block 102, storing the model feature quantities into the learning data storage block 73. Further, on the basis of error ratio ejk of the selected weak learner fjk, the learner selection block 107 calculates a confidence to store the obtained confidence into the learning data storage block 73 and, at the same time, supply the obtained confidence to the weight update block 108.

To be more specific, on the basis of the minimum error ratio ejk of the selected weak learner fjk, the learner selection block 107 calculates confidence cjk as shown in equation (10) below and supplies the obtained confidence to the weight update block 108.

$$e_{jk} = \log((1 - e_{jk})/e_{jk}) \quad (10)$$

The weight update block 108 recalculates weight Wi for each learning image on the basis of the supplied confidence cjk and, at the same time, normalizes the weight Wi for updating, thereby supplying the updated weight to the weight setting block 104. On the basis of the supplied updated weight, the weight setting block 104 sets weight Wi in unit of learning image.

To be more specific, on the basis of the supplied confidence cjk, the weight update block 108 recalculates weight Wi for each learning image as shown in equation (11) below and, at the same time, normalizes all weights Wi for updating, thereby supplying a result of the update to the weight setting block 104. The weight setting block 104 sets weight Wi for each learning input image on the basis of the result of weight updating supplied from the weight update block 108.

$$w_i = w_i \exp[-e_{jk} \cdot 1_{(y \neq f_{jk})}], i=1, 2, \ldots N \quad (11)$$

Namely, equation (11) above indicates that weight Wi of the learning image that includes the error-caused feature quantity becomes large.

The learner selection block 107 stores weak learner fjk obtained by Q-th learning for example into the learning data storage block 73 as Q-th weak learner fQ (or updates the weak learners stored in the learning data storage block 73). Namely, the learner selection block 107 updates learner R(x) as shown in equation (12) below and stores a result of the updating into the learning data storage block 73 in a form a shown in equation (13) below.

$$R(x) = R(x) + c_{jk} \times f_{jk}(x) \quad (12)$$

$$\text{sign}(R(x)) = \text{sign}(R(x) + c_{jk} \times f_{jk}(x)) \quad (13)$$

Namely, the weighted weak learner fjk is added to the already stored learner R(x) to be updated to a new learner R(x). In equation (13) above, sign (Y) is a function denoting that, if Y is positive, "+1" is outputted indicative that a target object of recognition is found in an input image and, if Y is negative, "−1" is outputted indicative that a target object of recognition is not found in an input image.

Next, the learner selection block 107 reads the model feature quantities corresponding to the combination of local feature quantities at feature point k of the weak learner fjk from the learning model feature quantity storage block 102 and stores the read model feature quantities into the learning data storage block 73.

The learner selection block 107 stores learner R(x) made up of L weak learners fjk having comparatively low error ratio into the learning data storage block 73 and the model features of the corresponding combination of local feature quantities of feature point k to be used in each weak learner fjk (namely, the combination of Gabor filters used for the computation of correlation coefficients) into the learning data storage block 73. Here, L≦N×P.

It should be noted that the learner of equation (13) above is said to be a function that outputs the presence or absence of a target object of recognition by the majority decision of L weak learners. Thus, the learning processing for generating learners by repeating weighting and adding weak learners by learning processing is referred to as a Discrete AdaBoost Algorithm.

The following describes the learning processing to be executed in the learning mode in the image processing apparatus 11 with reference to the flowchart shown in FIG. 9.

In step S31, the face detection block 32 detects a portion corresponding to a face from an image including a face image obtained by the mage capture block 31 and supplies the detected face mage to the face feature point detection block 51 and the face alignment block 52.

In step S32, the face feature point detection block 51 detects feature parts of face (or face feature positions), eye, nose, and mouth, for example.

In step S33, on the basis of the face feature points detected by the face feature point detection block 51, the face alignment block 52 executes morphing processing based on affine transformation, for example, on the face image supplied from the face detection block 32, thereby executing transformation so as to transform the face image into one that corresponds to a face image taken from the front. The transformed face image is supplied to the local feature calculation block 71.

In step S34, the local feature calculation block 71 computes local feature quantities by use of Gabor filters as described before with reference to FIG. 2, for example.

In step S35, the local feature calculation block 71 puts at least a part of the local feature quantities obtained through Gabor filters into several combinations as described before with reference to FIG. 3 and supplies the obtained combinations to the learner generation block 72. A combining method to be used and the number of combinations to be generated may be determined beforehand experimentally or empirically or it is preferable to make selection such that frequency bands and directions are continuous as described before with reference to FIG. 3, for example.

In step S36, the correlation coefficient computation block 101 of the learner generation block 72 reads the feature quantities of learning model from the learning model feature quantity storage block 102 and computes a correlation coefficient between the local feature quantities supplied from the local feature calculation block 71 and the combination of learning models of the same combination.

In step S37, learner generation processing to be described later with reference to FIG. 10 is executed.

In step S38, the learner generation block 72 supplies the learners generated in step S36 to the learning data storage block 73 for storage and, at the same time, reads the model feature quantities corresponding to weak learners from the learning model feature quantity storage block 102 to store these model feature quantities into the learning data storage block 73. Further, on the basis of the error ratio of the selected weak learner, the learner selection block 107 calculates confidence and stores the calculated confidence into the learning data storage block 73, upon which the processing ends.

By the above-mentioned processing, learners are generated in the learning mode to be stored in the learning data storage block 73 and the model feature quantities corresponding to the generated learners and the confidence thereof are stored in the learning data storage block 73. Namely, the recognition feature quantities indicative which combinations of the Gabor features used for generating learners are for which feature points (for example, if 40 Gabor filters are prepared in total, which thereof are put into combinations) and the information indicative of the confidence of these learners are stored in the learning data storage block 73.

The following describes the learner generation processing to be executed by the learner generation block 72 in step S37 of FIG. 9, w-th reference to the flowchart shown in FIG. 10.

In step S91, the weight setting block 104 initializes weight Wi for each learning image to 1/M and initializes counter Q to 1 and learner R(x) to 0. Here, i identifies each of two or more learning input images PIi and 1≦i≦M. Therefore, by the processing of step S91, all learning images PIi are set to the same normalized weight (=1/M).

In step S92, the sampling block 103 selects M feature quantities in accordance with the weight Wi of learning input image PIi for each combination of the local feature quantities of feature point k (k=1, 2, 3, ... N), namely, N×P feature quantities supplied for one learning image (namely, correlation coefficients computed by the correlation coefficient computation block 101) and supplies the selected M feature quantities to the sort block 105.

Namely, as described before with reference to FIG. 8, for example, N×P feature quantities are supplied from the correlation coefficient computation block 101 to the sampling block 103 with learning image PI1 being (A1-1, A1-2, ... A1-$p$, A2-1, A2-2, ... A2-$p$, ... AN-1, AN-2, ... AN-p). Likewise, the feature quantities of each feature point are supplied from the correlation coefficient computation block 101 to the sampling block 103 with learning image PI2 being (B1-1, B1-2, ... B1-$p$, B2-1, B2-2, ... B2-$p$, ... BN-1, BN-2, ... BN-p), learning image PI3 being (C1-1, C1-2, ... C1-$p$, C2-1, C2-2, ... C2-$p$, ... CN-1, CN-2, ... CN-p), and learning image PIM being (M1-1, M1-2, ... M1-$p$, M2-1, M2-2, ... M2-$p$, ... MN-1, MN-2, ... MN-p).

In this case, the feature quantity in combinations of the first local feature quantity of feature point k=1 is (A1-1, B1-1, C1-1, ... M1-1) indicated by group Gr1-1. The feature quantity in combinations of the second local feature quantity of feature point k=1 is (A1-2, B1-2, C1-2, ... M1-2) indicated by group Gr1-2. Likewise, the feature quantity in combinations of the Pth local feature quantity of feature point k=N is (AN-P, BN-P, CN-P, ... MN-P) indicated by group GrN-P.

Namely, a group of M feature quantities is set for each learning image PIi for the combination of P types of local feature quantities for each of k feature points.

The sampling block 103 extracts M feature quantities by drawing for each of P combinations of the local feature quantities of each feature point k in accordance with the weight set to each learning image PIi. In the first processing, all weights Wi are equal, so that, when M feature quantities are drawn, all feature quantities will be selected in terms of statistics.

Therefore, it is assumed here that, in the first processing, all feature quantities be selected in each combination of local feature point for each feature point k. Obviously, the same feature quantity may be duplicately selected in actual cases.

In step S93, the sort block 105 sorts the feature quantities in the ascending order of powers or the descending order of powers for each of M feature quantity groups sampled for each combination of the local feature quantities of each of N feature points and supplies the sorted feature quantities to the learner setting block 106.

In step S94, on the basis of the information indicative whether the learning image with input feature quantities extracted includes a target object of recognition, the learner setting block 106 controls the error ratio calculation block 121, while changing threshold values, for each of M feature quantities for each combination of P types of local feature quantities at each feature point, to calculate error ratio ejk as shown in equation (9) above, thereby setting a threshold so as to minimize error ratio ejk. Here, threshold thjk for each combination of local feature quantities at each feature point k provides one weak learner fjk. Therefore, the learner setting block 106 supplies error ratio ejk for each weak learner for the learner selection block 107. Namely, N×P weak learners fjk in accordance with N×P feature quantities are set for each combination of P types of local feature quantities at each of N feature points k and error ratio ejk is obtained for each of N×P (namely, for each weak learner fjk). It should be noted that weak learner fjk is a function that outputs "+1" if a target object of recognition is included and "−1" if a target object of recognition is not included.

Namely, like the case described with reference to FIG. 5, if the feature quantities (or the obtained correlation coefficients) corresponding to a certain combination of feature quantities at a certain feature point are arranged in the ascending order of powers or the descending order of powers, the decision of an error or no error is made on the basis which side of the set threshold thjk the feature quantities corresponding to the learning image including a target object of recognition and the feature quantities corresponding to the learning image not including a target object of recognition are located. As shown in equation (9) above, on the basis of the errata Information (namely, the information indicative whether a target object of recognition is included or not) of the learning image, the error ratio calculation block 121 adds the weights Wi of the learning images with the feature quantities regarded as error extracted, thereby calculating error ratio ejk.

In step S95, of N weak learners fjk, the learner selection block 107 selects the weak learner fjk that minimizes error ratio ejk.

In step S96, on the basis of the minimum error ratio ejk of the selected weak learner, the learner selection block 107 calculates confidence cjk as shown in equation (10) above and supplies the obtained confidence to the weight update block 108.

In step S97, the weight update block 108 recalculates weight Wi for each learning input image on the basis of the supplied confidence cjk as shown in equation (11) above and, at the same time, normalizes all the weights Wi for updating, thereby supplying the updated weight to the weight setting block 104. On the basis of the supplied updated weight, the weight setting block 104 sets weight in unit of learning input image.

In step S98, on the basis of the selected weak learner fjk, the learner selection block 107 stores the Q-th weak learner fQ into the learning data storage block 73. In other words, the learner selection block 107 updates the weak learner fQ−1 that is (Q−1)th weak learner stored in the learning data storage block 73 to the Q-th weak learner fQ obtained by adding the selected weak learner fjk.

Namely, as shown in equation (12) above, the learner selection block 107 updates learner R(x) and stores the updated learner into the learning data storage block 73 in the form shown n equation (13) above.

Thus, the weighted weak learner fjk is added to learner R(x).

In step S99, the learner selection block 107 reads the model feature quantities in combinations of local feature quantities corresponding to feature point k of weak learner fjk from the learning model feature quantity storage block 102 and stores the model feature quantities into the learning data storage block 73.

In step S100, the learner selection block 107 determines whether counter Q is greater than L. If counter Q is found not greater than L, then the procedure goes to step S101, in which counter Q is incremented by one, upon which the procedure returns to step S92. If counter Q is found greater than L, then this processing comes to an end.

By the above-mentioned processing, learner R(x) made up of L weak learners fQ having a comparatively low error ratio (1<Q<L) is stored in the learning data storage block 73 and the model feature quantities of feature point k to be used by each weak learner fQ are stored in the learning data storage block 73. Here, L≦N×P.

It should be noted that the learner in equation (13) may be said to be a function that outputs the presence or absence of a target object of recognition by the majority decision of L weak learners. The learning processing configured to generate learners by repeating the weighting of learners and adding these learners is referred to as the Discrete AdaBoost Algorithm.

Namely, the processing is repeated by the above-mentioned learner generating processing in which a learner and an error ratio are calculated for each model feature quantity so as to sequentially increase the weight for the learning input features of a learning input image having a higher error ratio and sequentially decrease the weight of the earning input feature quantities having a lower error ratio. Therefore, in the repetition processing (steps S92 through S101), the learning input feature quantities to be selected at setting learners (learning input quantities selected in step S9) that have higher error ratios are selected gradually easily, so that as the learning input features difficult to be recognized are repeatedly selected, more feature quantities of the learning input images difficult to be recognized are selected, thereby enabling to eventually generate learners of high recognition ratios.

Also, in the repetition processing (steps S92 through S101), the learner selection block 107 comes to typically select the weak learner corresponding to the model feature quantity having the lowest error ratio, so that, by repeating the learning processing, the weak learner about the model feature quantities having high confidence is typically selected to be added to learners, resulting in the sequential adding of accuracy weak learners every time the repetition is made.

Namely, by the above-mentioned learning processing, learner R(x) made up of L weak learners having low error ratio ejk are generated by use of the feature quantities with geometrical constraints added for each feature point and each combination. As a result, the learners made up of only learners having high confidence are configured, so that a learner having high confidence can be configured with a limited number of weak learners, thereby enabling to reduce the computation processing load in the recognition processing to be described later to enhance the accuracy of recognition.

As the number of learners is increased (or L mentioned above is increased), the number of weak learners is increased to enhance the accuracy of recognition. On the other hand, if the number of learners is decreased (or L is decreased), the selected learner can execute the recognition processing based on only the weak learners of high confidence although the number is small, so that the computation processing load in the recognition processing can be lowered while maintaining confidence. Namely, as required, it is practicable to generate learners of high accuracy by increasing the number of learners to be generated by repeating the learning processing; conversely, it is also practicable to generate learners of comparatively high accuracy by decreasing number of learners to be generated by reducing the learning load, namely, by executing a one-shot learning so to speak.

The following describes recognition processing 1 to be executed by the image processing apparatus 11, with reference to the flowchart shown in FIG. 11.

In step S131, the face detection block 32 detects a portion corresponding to the face from an image including a face image supplied from the image capture block 31 and supplies the detected face mage to the face feature point detection block 51 and the face alignment block 52.

In step S132, the face feature point detection block 51 detects feature parts of face (or face feature positions), eye, nose, and mouth, for example.

In step S133, on the basis of the face feature points detected by the face feature point detection block 51, the face alignment block 52 executes morphing processing based on affine transformation, for example, on the face image supplied from the face detection block 32, thereby executing transformation so as to transform the face image into one that corresponds to a face image taken from the front. The transformed face image is supplied to the local feature calculation block 71.

In step S134, the local feature calculation block 71 computes local feature quantities by use of Gabor filters as described before with reference to FIG. 2, for example.

In step S135, the local feature calculation block 71 gets the information about recognition feature quantities from the learning data storage block 73.

The above-mentioned information about recognition feature quantities is indicative of a particular combination for a particular feature point (for example, if a total of 40 Gabor filters are used, a particular combination of some of these filters is used at which particular point for use in a particular learner).

For example, in generating learners, if a total of 40 Gabor filters are prepared, the combinations of local feature quantities of a certain feature point indicated in the recognition feature quantities may or may not include a combination that includes all feature quantities obtained by the 40 Gabor filters, namely, 40-dimension feature vectors. In other words, the information about recognition feature quantities indicates two or more combinations of not greater than 40 Gabor features or two or more combinations of less than 40 Gabor features depending upon the learners obtained by learning.

In step S136, on the basis of the local feature quantities obtained by the Gabor filters and the information about the obtained recognition feature quantities, the local feature calculation block 71 generates a combination of the local feature quantities of a feature point indicated in the recognition feature quantities and supplies the generated combination to the face recognition block 74 as the information about correlation coefficient computation.

In step S137, the face recognition block 74 reads the feature quantities of a registered face image from the face registration database 35.

In step S138, the face recognition block 74 reads a learner from the learning data storage block 73 and substitutes the feature quantities for calculation. To be more specific, the face recognition block 74 computes a correlation coefficient between a combination of the local feature quantities of a feature point indicated in the recognition feature quantities supplied from the local feature calculation block 71 as the information for correlation coefficient computation and that corresponding to a combination of the local feature quantities of a feature point indicated in the recognition feature quantities of the feature quantities of the registered face image read from the face registration database 35 and substitutes, as the feature quantities, the obtained correlation coefficient into the learner read from the learning data storage block 73 for calculation.

Namely, as described above, because the feature quantities supplied from the local feature calculation block 71 as the information about correlation coefficient computation is the feature quantities necessary for the calculation of weak learners fjk of high confidence in learning, the face recognition block 74 substitutes the supplied selected feature quantities into the learners read from the learning data storage block 73 for calculation of learner R(x). Then, the face recognition block 74 supplies a result of voting with a decision result of each weak learner fjk weighted to the recognition result output block 36 as a result of the calculation.

In step S139, on the basis of a result of the calculation supplied from the face recognition block 74, the recognition result output block 36 outputs a result of the recognition whether there is target object of recognition or not. Namely, because the result of calculation supplied from the face recognition block 74 is the computation result indicated by equation (13) above, the recognition result output block 36, if "+1" is supplied as the computation result, outputs a result indicative that the target object of recognition is included in the input image and, if "−1" is supplied, outputs a result indicative that the target object of recognition is not included in the input image, upon which the this processing comes to an end.

By the above-mentioned processing, a target object is recognized on the basis of learner R(x) made up of L weak learners fjk having comparatively low error ratio ejk generated by use of the feature quantities with geometrical constraints added to the feature quantities of each feature point in the course of the learning processing.

It should be noted that, in the above-described example, the learning processing is executed on the basis of the Discrete AdaBoost Algorithm; however, it is also practicable to use another boosting algorithm. For example, the Gentle AdaBoost Algorithm may be used. The Discrete AdaBoost Algorithm and the Gentle AdaBoost Algorithm are different in that the former learner's output result is a discrete variable while the latter learner's output result is a continuous variable. However, in the former, confidence is multiplied, so that the output result is substantially handled as a continuous variable, thereby presenting little difference in the processing. If the Gentle AdaBoost Algorithm is applied, equations (11) and (13) above are rewritten with equations (14) and (15) below, the processing remaining the same.

$$w_i = w_i \exp[-y_i fm(x_i)] \quad (14)$$

$$\text{sign}(R(x)) = \text{sign}(R(x) + f_{jk}) \quad (15)$$

Namely, if the Gentle AdaBoost Algorithm is applied, each weak learner fjk outputs a continuous variable that includes confidence, so that corresponding weighting is made to omit the calculation of confidence.

In the above, the recognition of face images based on Gabor filters and boosting algorithms has been described. The present invention is also applicable to the image recognition processing other than face image recognition and non-recognition processing as far as the processing is executed by acquiring feature quantity vectors based on two or more feature quantities, a correlation coefficient with learning feature quantity vectors is computed at the time of learning, and a correlation coefficient with feature quantity vectors registered for decision processing is computed at the time of decision processing.

For example, if a correlation coefficient is computed by use of two or more S-dimension feature quantity vectors in the case where non-face image matching is determined and in the case of audio recognition processing, the matching is determined by not only one correlation coefficient obtained from S-dimension feature quantity vectors but by two or more correlation coefficients by use of two or more feature vectors of less than S dimensions generated from S-dimension feature quantities, thereby enhancing the accuracy of decision.

As described above, if boosting algorithms are used for learning and decision, the amount of computation will not explosively increase as the number of dimensions increases, as compared with the use of SVM (Support Vector Machine) for example, thereby making boosting algorithms preferable.

If Gabor filters are used for the extraction of feature quantities, the technique as described above allows the selection and learning of the filter frequency and direction best representative the features of a local area (or a particular feature point), thereby making boosting algorithms preferable for learning and decision.

As described above, if predetermined information, the first feature quantity such as a face image for example, is obtained with a sensor or the like, the obtained first feature quantity is processed predetermined processing as necessary by information processing means such as the face detection block 32 or the face image conversion block 33 shown in FIG. 1, and it is determined whether a second feature quantity registered for learning or decision (or obtained by an information acquisition block such as a sensor) and the obtained (and processed as necessary) first feature quantity are from a same signal source, not only all dimensions of the correlation vector of the first feature quantity and the correlation vector of the second feature quantity but also two or more correlation coefficient vectors using at least a part of dimensions are computed, thereby significantly enhancing the performance of classification of information.

Figure 12:
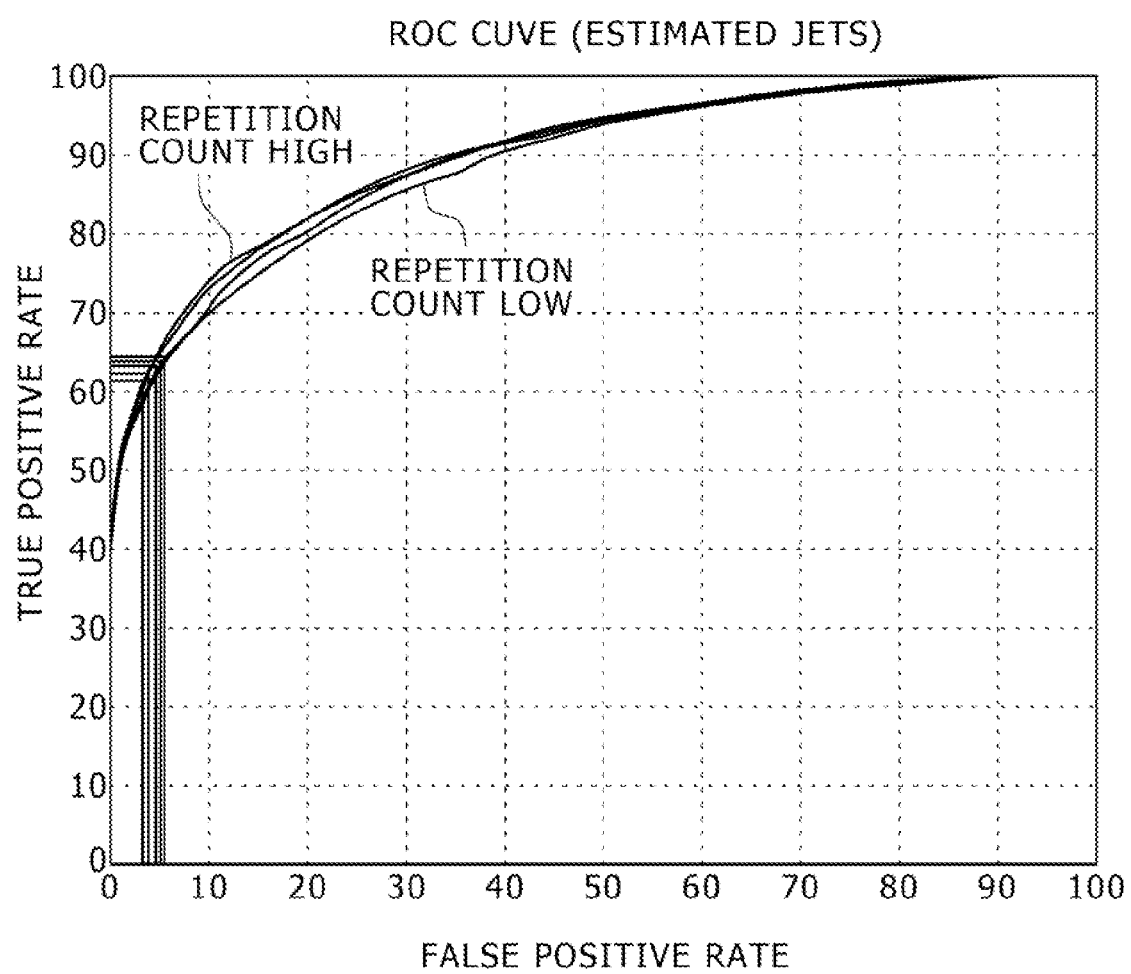
FIG. 12 is a diagram describing detected accuracy resulted from the case in which when only one type of correlation coefficient is obtained by use of 40-dimension feature vectors based on all 40 types of Gabor filters.
Figure 13:
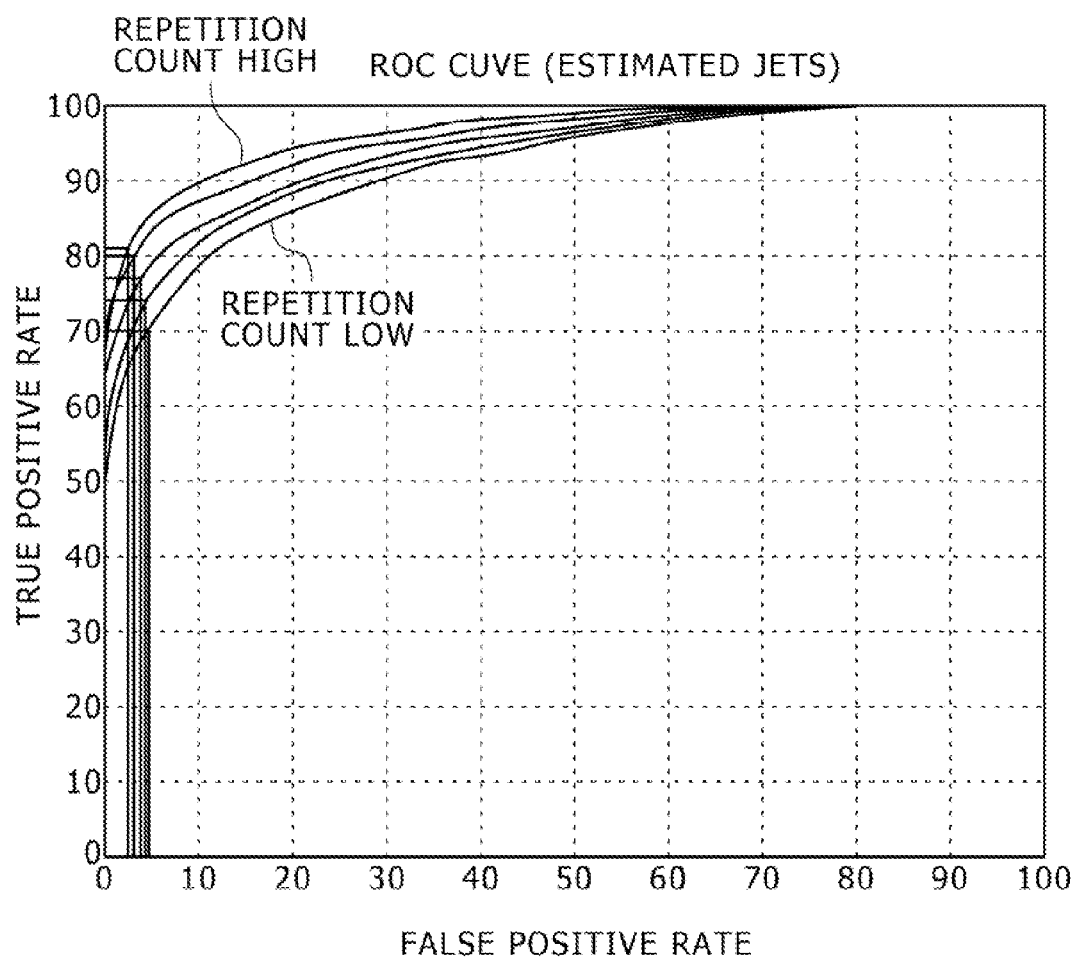
FIG. 13 is a diagram describing detected accuracy resulted from the case in which a plurality of correlation coefficients are obtained by use of eight-dimension different combinations of feature vectors after selecting some of 40 types of Gabor filters.

FIG. 12 shows detection accuracies obtained when only one correlation coefficient is obtained by use of 40-dimension feature vectors by use of all the 40 Gabor filters. FIG. 13 shows detection accuracies obtained when a part of the 40 Gabor filters is selected and two or more correlation coefficients are obtained by use of the feature vectors obtained by 8-dimension different combinations.

With both of FIGS. 12 and 13, the vertical axis is representative of the ratio of correct detection and the horizontal axis is representative of the ratio of error detection. Namely, the more drastically curves change, the higher the accuracy of detection.

As shown in FIGS. 12 and 13, the accuracy of detection with two or more correlation coefficients obtained by use of feature vectors in 8 different combinations by selecting a part of 40 Gabor filters is higher than the accuracy of detection with only one correlation coefficient obtained by use of all the 40-dimension feature vectors. Namely, the performance of classification of information can be significantly enhanced by computing not only all dimensions of a correlation vector of the obtained feature quantity but also two or more correlation vectors by use of at least a part of dimensions.

It should be noted that the above-mentioned image processing apparatus 11 is configured to operate in the two modes, the learning mode and the recognition mode, to execute recognition processing by use of learners generated by the learner generation block 72. However, it is also practicable to internally store the information for recognition processing obtained as a result of the execution in the learning mode by the image processing apparatus 11, namely, the learners and the information about the recognition feature quantities, thereby configuring an image processing apparatus that executes the processing in only the recognition mode without requiring the learner generation block 72.

Figure 14:
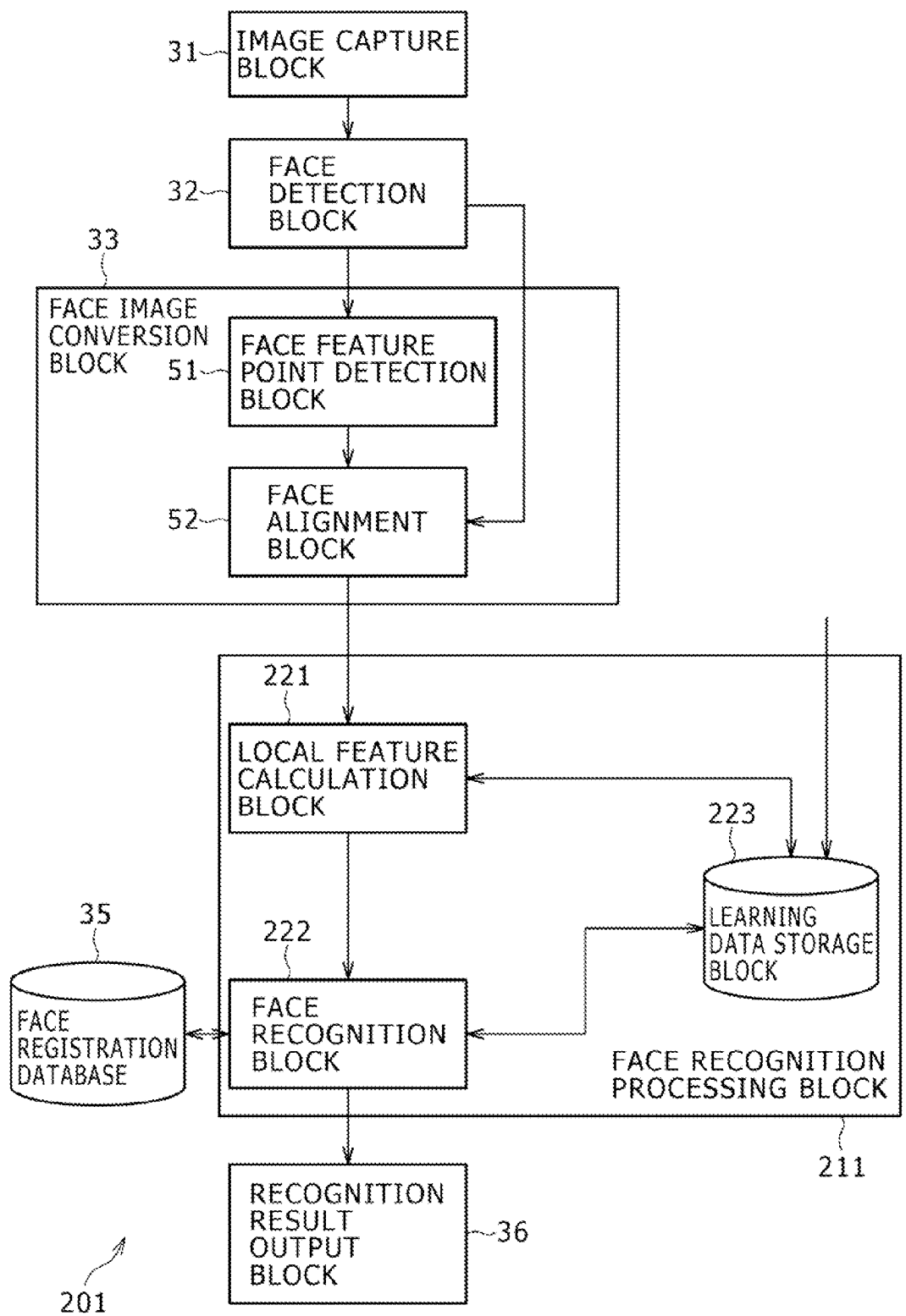
FIG. 14 is a block diagram illustrating another exemplary configuration of an image processing apparatus.

FIG. 14 is a block diagram illustrating an image processing apparatus 201 configured to execute recognition processing by use of the information for recognition processing obtained as a result of learning processing.

With reference to FIG. 14, components similar to those previously described with reference to FIG. 1 are denoted by the same reference numerals and the description thereof will be skipped.

Therefore, the image processing apparatus 201 is basically the same in configuration with the image processing apparatus 11 shown in FIG. 1 except for a face recognition processing block 211 instead of the face recognition processing block 34 shown in FIG. 1. The face recognition processing block 211 has a local feature calculation block 221 instead of the local feature calculation block 71 shown in FIG. 1, a face recognition block 222 instead of the face recognition block 74 shown in FIG. 1, a learning data storage block 223 instead of the learning data storage block 73 shown in FIG. 1, and no component equivalent to the learner generation block 72 shown in FIG. 1.

The face recognition processing block 211 does not have the learner generation block 72 shown in FIG. 1. However, the learning data storage block 223 stores beforehand the information necessary for recognition processing obtained as a result of the processing in the learning mode by the image processing apparatus 11.

Namely, the learning data storage block 223 stores beforehand the learners generated in the learning mode by the learner generation block 72 of the image processing apparatus 11 and the information about the recognition feature quantities. To be more specific, the learning data storage block 223 stores the learners generated by the execution of statistical learning processing based on AdaBoost by use of the feature quantities of a learning image computed by the local feature calculation block 71 in the learning mode of the image processing apparatus 11 and the feature quantities of a learning model stored beforehand and the information about these learners (correlation values and the information indicative of the confidence of the learners) as well as the information indicative of model feature quantities that largely affect the recognition of a target face image, namely, the recognition feature quantities that is the information indicative of a particular local feature quantity at a particular feature point (a particular combination of filter directions and frequencies of Gabor filters or a particular rectangular area portion).

The image processing apparatus 201 can execute image recognition processing by use of a taken image of person so as to determine whether that person is a registered person or not.

The image processing apparatus 201 does not execute processing in the learning node; instead, the image processing apparatus 201 recognizes each image by use of learners stored in the learning data storage block 223 and the information of recognition feature quantities so as to determine whether the image to be recognized includes the face of a registered person or not.

It should be noted that the description is made by assuming that the face registration database 35 be included in the image processing apparatus 201; however, it is also practicable to configure the face registration database 35 to be connected to the image processing apparatus 201 via a network, not shown, for example. The connection of the face registration database 35 to the image processing apparatus 201 via a network or the like allows the sharing of one face registration database 35 between two or more image processing apparatuses 201.

As described above the components, image capture block 31 through the face image conversion block 33, have basically the same configuration of the image processing apparatus 11 shown in FIG. 1.

Namely, the image capture block 31 is configured to have a camera for example, thereby capturing a taken image of a person, through the capability of taking images of persons, through an externally arranged camera, or taken from another device having image taking capabilities. The image captured by the image capture block 31 is supplied to the face detection block 32.

The face detection block 32 analyzes the image supplied from the image capture block 31 to extract the portion (namely, the position and size) of a face of person, thereby detecting an image of the extracted portion of the face of person (hereafter referred to as a face image).

The face image conversion block 33 is made up of a face feature point detection block 51 and the a face alignment block 52.

The face feature point detection block 51 detects feature points for alignment for use in the morphing processing by the face alignment block 52 to be described later from the face image supplied from the face detection block 32. The face alignment block 52 analyzes the face image supplied from the face detection block 32 and the alignment feature point detected by the face feature point detection block 51 to detect in which direction the extracted face is directed, thereby executing morphing processing, such as affine transformation, so as to put the face feature position to a reference position.

The face recognition processing block 211 is configured having a local feature calculation block 221, a learning data storage block 223, and a face recognition block 222.

The face image with the extracted feature points corrected to reference position is supplied to the local feature calculation block 221 of the face recognition processing block 211. The local feature calculation block 221 gets the information about recognition feature quantities from the learning data storage block 223. The local feature calculation block 221 calculates the local feature quantities at a feature point that matches the recognition feature quantities of the supplied face image. The local feature calculation block 221 is configured by Gabor filters.

The local feature calculation block 221 calculates the feature quantities at the feature point that matches the recognition feature quantities by use of two or more Gabor filters having different directions and frequencies. As with the case described before with reference to FIG. 2, the local feature calculation block 221 uses 8 directions and 5 frequencies and at least a part of a total of 40 Gabor filters to execute the processing in which the feature quantities at the feature point matching the recognition feature quantities are computed.

The feature quantities obtained by the local feature calculation block 221 are supplied to the face recognition block 222.

By use of learners stored in the learning data storage block 223, the face recognition block 222 makes a comparison between the feature quantities at the feature point matching the recognition feature quantities obtained by the local feature calculation block 221 and the registered face image data stored in the face registration database 35, namely, calculates a correlation coefficient to find a match with a registered person, thereby supplying a result of the comparison to the recognition result output block 36. Namely, on the basis of the confidence of the learners stored in the learning data storage block 223, the face recognition block 222 executes a majority decision of the comparison result of the learners, thereby determining whether there is a match with registered persons.

The face registration database 35 stores the information about the feature quantities necessary for the recognition of registered persons. Namely, The face registration database 35 may store all Gabor jets at all feature points of the face images of registered persons; however, face registration database 35 may only store at least the information about the feature quantities corresponding to the recognition feature quantities.

The data of feature quantities registered in the face registration database 35 (namely, the registered face image data) may be the data that is obtained to be registered as a result of the processing done by the components, the image capture block 31 through local feature calculation block 7: shown in FIG. 1, or the components, the image capture block 31 through the local feature calculation block 221 shown in FIG. 14 or the data that is externally obtained for registration as far as the data is similar to the data obtained as a result of the processing done by the components, the image capture block 31 through the local feature calculation block 71 shown in FIG. 1, or the components, the image capture block 31 through the local feature calculation block 221 shown in FIG. 14.

The recognition result output block 36 externally gives the decision result supplied from the face recognition block 222, in the form of buzzer sound, text display, or LED lighting, for example, and outputs the decision result to external devices. To be more specific, the recognition result output block 36 may be configured having a display monitor, for example, thereby showing the decision result in the form of a message, for example.

As described above, the image processing apparatus 201 makes a comparison between feature quantities to determine whether the obtained face image of person matches a registered face image of person.

The following describes recognition processing 2 to be executed by the image processing apparatus 201 with reference to the flowchart shown in FIG. 15.

In step S211, the face detection block 32 detects a portion corresponding to the face from an image including a face image obtained by the image capture block 31 and supplies the detected face image to the face feature point detection block 51 and the face alignment block 52.

In step S212, the face feature point detection block 51 detects feature parts of face (or face feature positions), eye, nose, and mouth, for example.

In step S213, on the basis of the face feature points detected by the face feature point detection block 51, the face alignment block 52 executes morphing processing based on affine transformation, for example, on the face image supplied from the face detection block 32, thereby executing transformation so as to transform the face image into one that corresponds to a face image taken from the front. The transformed face image is supplied to the local feature calculation block 221.

In step S214, the local feature calculation block 221 gets the information about recognition feature quantities from the learning data storage block 223.

The above-mentioned information about recognition feature quantities is the information indicative that the Gabor feature used for the generation of learners is of which combination for which feature point (for example, if a total of 40 Gabor filters are prepared, which of filter combinations is used at which feature position and for which learner).

In step S215, the local feature calculation block 221 obtains the local feature quantities of a feature point that matches the information of recognition feature quantities by use of Gabor filters as described with reference to FIG. 2.

In step S216, on the basis of the local feature quantities obtained by Gabor filters and the information about the obtained recognition feature quantities, the local feature calculation block 221 generates a combination of the local feature quantities at the feature point indicated in the recognition feature quantities and supplies the generated combination to the face recognition block 222 as the information for computing correlation coefficients.

In step S217, the face recognition block 222 reads the feature quantities of registered face from the face registration database 35.

In step S218, the face recognition block 222 reads learners from the learning data storage block 223 and substitutes feature quantities for calculation. To be more specific, the face recognition block 222 computes a correlation coefficient between a combination of the local feature quantities of a feature point indicated in the recognition feature quantities supplied from the local feature calculation block 221 as the information for correlation coefficient computation and that corresponding to a combination of the local feature quantities of a feature point indicated in the recognition feature quantities of the feature quantities of the registered face image read from the face registration database 35 and substitutes, as the feature quantities, the obtained correlation coefficient into the learner read from the learning data storage block 223 for calculation.

Namely, as described above, because the feature quantities supplied from the local feature calculation block 221 as the information about correlation coefficient computation is the feature quantities necessary for the calculation of weak learners fjk of high confidence, the face recognition block 222 substitutes the supplied selected feature quantities into each weak learner fjk for the calculation of learner R(x). Then, the face recognition block 222 supplies a result of voting with a decision result of each weak learner fjk weighted to the recognition result output block 36 as a result of the calculation.

In step S219, on the basis of a result of the calculation result supplied from the face recognition block 222, the recognition result output block 36 outputs a result of the recognition whether there is target object of recognition or not. Namely, because the result of calculation supplied from the face recognition block 222 is the computation result indicated by equation (13) above, the recognition result output block 36, if "+1" is supplied as the computation result, outputs a result indicative that the target object of recognition is included in the input image and, if "−1" is supplied, outputs a result indicative that the target object of recognition is not included in the input image, upon which the this processing comes to an end.

By the above-mentioned processing, only the recognition feature quantities processing are extracted on the basis of the information about the recognition feature quantities stored in the learning data storage block 223 and the processing of recognizing a target object is executed by learner R(x) made up of L weak learners fjk having comparatively low error ratio ejk stored in the learning data storage block 223.

It should be noted that, in the above-described example, the learning processing is executed on the basis of the Discrete AdaBoost Algorithm also in the image processing apparatus 201; however, it is also practicable to use another boosting algorithm. For example, the Gentle AdaBoost Algorithm may be used. The Discrete AdaBoost Algorithm and the Gentle AdaBoost Algorithm are different in that the former learner's output result is a discrete variable while the latter learner's output result is a continuous variable. However, in the former, confidence is multiplied, so that the output result is substantially handled as a continuous variable, thereby presenting little difference in the processing. If the Gentle AdaBoost Algorithm is applied, equations (11) and (13) above are rewritten with equations (14) and (15) above, the processing remaining the same.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions. In this case, the image processing apparatus 11 described with reference to FIG. 1 is configured by a personal computer 301 as shown in FIG. 16, for example.

Referring to FIG. 16, a CPU (Central Processing Unit) 311 executes various processing operations as instructed by programs stored in a ROM (Read Only Memory) 312 or loaded in a RAM (Random Access Memory) 313 from a storage block 318. The RAM 313 also stores, from time to time, those data which are necessary for the CPU 311 to execute various processing operations.

The CPU 311, the ROM 312, and the RAM 313 are interconnected via a bus 314. The bus 314 is also connected with an input/output interface 315.

The input/output interface 315 is connected with an input block 316 based on keyboard and mouse for example, an output block 317 based on display monitor and loudspeaker for example, the storage block 318 based on hard disk for example, and a communications block 319 based on modem and terminal adaptor for example. The communications block 319 executes communications processing via a network such as the Internet for example.

The input/output interface 315 is also connected with a drive 320 as required, on which a magnetic disk 331, an optical disk 332, a magneto-optical disk 333, or a semiconductor memory 334 is loaded. Computer programs read from any of these recording media are installed in the storage block 318 as required.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 16, these recording media are constituted by not only a package media made up of the magnetic disk 331 (including flexible disks), the optical disk 332 (including CD-ROM (Compact Disk Read Only Memory) and DVD (Digital Versatile Disk)), the magneto-optical disk 333 (including MD (Mini Disk) (trademark)), or the semiconductor memory 334 which is distributed separately from the apparatus itself to supply the program to a user, but also the ROM 312 or the storage block 318 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus, comprising:
combination generating means for obtaining a first feature quantity of N dimensions, N being an integer of at least two, from first information prepared for execution of learning and using said first feature quantity to generate at least two first feature quantity combinations having corresponding dimensions that fail to exceed the N dimensions of said first feature quantity; and
learning processing executing means for computing a correlation coefficient between said first feature quantity combinations and a learning model feature quantity matching each dimension of said first feature quantity combinations and, by use of said first correlation coefficient, classifying said first information to execute learning processing for classifying predetermined second information,
wherein said combination generating means is configured to:
obtain a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and
generate said first feature quantity combinations by combining elements within corresponding continuous areas of the matrix, the continuous areas being associated with ranges of the filter directions and frequencies of the Gabor filters.

2. The information processing apparatus according to claim 1, wherein said first feature quantity of said N dimensions is a feature quantity obtained by N of the Gabor filters.

3. The information processing apparatus according to claim 2, wherein said combination generating means generates a plurality of said first feature quantity combinations by combining said first feature quantity included in an area continuous in a matrix generated as classified by a filter frequency and a filter direction of said N Gabor filters in a feature quantity obtained by said N Gabor filters.

4. The information processing apparatus according to claim 3, wherein said combination generating means generates the plurality of first feature quantity combinations by combining said first feature quantity included in a rectangular area of the matrix associated with predetermines ranges of filter frequency and filter direction.

5. The information processing apparatus according to claim 1, wherein said learning processing executing means executes said learning processing by classifying said first information by use of a boosting algorithm.

6. The information processing apparatus according to claim 1, wherein:
said combination generating means obtains, from said second information, predetermined second feature quantity not greater than N dimensions determined beforehand on the basis of a predetermined learner generated in said learning processing, and generates a plurality of second feature quantity combinations not greater than N dimensions of said second feature quantity determined beforehand on the basis of said learner,
the information processing apparatus further comprises classification processing executing means for computing a second correlation coefficient between said plurality of second feature quantity combinations generated by said combination generating means and a registered feature quantity matching each dimension of said plurality of second feature quantity combinations, thereby classifying said second information by use of the obtained second correlation coefficient and said learner.

7. An information processing method, comprising the steps of:
obtaining a first feature quantity of N dimensions, N being an integer of at least two, from first information prepared for executing learning;
generating a plurality of first feature quantity combinations having corresponding dimensions that fail to exceed the N dimensions of said first feature quantity;
obtaining a learning model feature quantity matching each dimension of said first feature quantity combinations;
computing a first correlation coefficient between said plurality of first feature quantity combinations and said learning model feature quantity; and
classifying predetermined second information by classifying said first information by use of said first correlation coefficient,
wherein generating the first feature quantity combinations comprises:
obtaining a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

8. The information processing method according to claim 7 further comprising:

obtaining a second feature quantity not greater than N dimensions determined beforehand on the basis of a learner obtained as a result of learning by said learning processing from said second information supplied to be classified by classification processing;

generating a plurality of second feature quantity combinations that are not greater than N dimensions of said second feature quantity determined beforehand on the basis of said learner by use of said second feature quantity;

obtaining a registered feature quantity matching each dimension of said plurality of second feature quantity combinations;

computing a second correlation coefficient between said plurality of second feature quantity combinations and said registered feature quantity; and classifying said second information by use of said learner obtained as a result of learning by said learning processing and said second correlation coefficient.

9. A non-transitory computer-readable medium for causing a computer to execute learning for classifying, comprising the steps of:

obtaining a first feature quantity of N dimensions, N being an integer of at least two, from first information prepared for executing learning;

generating a plurality of first feature quantity combinations having corresponding dimensions that fail to exceed the N dimensions of said first feature quantity;

obtaining a learning model feature quantity matching each dimension of said plurality of first feature quantity combinations;

computing a first correlation coefficient between said plurality of first feature quantity combinations and said learning model feature quantity; and classifying predetermined second information by classifying said first information by use of said first correlation coefficient, wherein generating the first feature quantity combinations comprises:

obtaining a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

10. The non-transitory computer-readable medium according to claim 9, further comprising:

obtaining a second feature quantity of not greater than N dimensions predetermined on the basis of a learner obtained as a result of the learning by said learning processing from said second information supplied to be classified by classification processing;

generating a plurality of second feature quantity combinations not greater than N dimensions of said second feature quantity determined beforehand on the basis of said learner by use of said second feature quantity;

obtaining a registered feature quantity matching each dimension of said plurality of second feature quantity combinations;

computing a second correlation coefficient between said plurality of second feature quantity combinations and said registered feature quantity; and classifying said second information by use of said learner obtained as a result of the learning by said learning processing and said second correlation coefficient.

11. A recognition apparatus capable of executing recognition processing for classifying predetermined information by use of a predetermined learner, comprising:

combination generating means for obtaining, from said predetermined information, a feature quantity having less than N dimensions determined beforehand on a basis of said learner to generate a plurality of feature quantity combinations having less than N dimensions; and classification processing executing means for computing a correlation coefficient between said of feature quantity combinations and a registered feature quantity matching each dimension of said feature quantity combinations to classify said predetermined information on the basis of said learner by use of said correlation coefficient, wherein said combination generating means is further configured to:

obtain a matrix comprising elements corresponding to the dimensions of the first feature quantity, the elements being output by Gabor filters associated with corresponding ones of the dimensions and being arranged within the matrix according to filter directions and frequencies associated with the Gabor filters; and generate said first feature quantity combinations by combining elements within corresponding continuous areas of the matrix, the continuous areas being associated with ranges of the filter directions and frequencies of the Gabor filters.

12. The recognition apparatus according to claim 11, wherein said feature quantity is a quantity obtained by any of a plurality of the Gabor filters.

13. The recognition apparatus according to claim 11, wherein said plurality of feature quantity combinations a plurality of combinations of matrix element included in a rectangular area of the matrix associated with predetermined ranges of the filter frequency and filter direction.

14. The recognition apparatus according to claim 11, wherein said classification processing executing means classifies said predetermined information by use of a boosting algorithm.

15. An information recognition method for use in a recognition apparatus capable of obtaining a feature quantity of N dimensions, N being an integer of at least two, to execute recognition processing for classifying predetermined information by use of a predetermined learner, comprising the steps of:

receiving said predetermined information;

obtaining, from said predetermined information, a predetermined feature quantity having less than N dimensions determined beforehand on the basis of said learner;

generating a plurality of feature quantity combinations having corresponding dimensions less than N dimensions of said feature quantity;

obtaining a registered feature quantity matching each dimension of said plurality of feature quantity combinations; and computing a correlation coefficient between said plurality of feature quantity combinations and said registered feature quantity to classify said predetermined information by use of said correlation coefficient, wherein generating the first feature quantity combinations comprises:

obtaining a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

16. A non-transitory computer-readable medium for causing program configured to make a computer to execute recognition processing capable of obtaining a feature quantity of N dimensions, N being an integer of at least two, to execute recognition processing for classifying predetermined information by use of a predetermined learner, comprising the steps of:

receiving said predetermined information;

obtaining, from said predetermined information, a predetermined feature quantity having less than N dimensions determined beforehand on the basis of said learner;

generating a plurality of feature quantity combinations having corresponding dimensions less than N dimensions of said feature quantity;

obtaining a registered feature quantity matching each dimension of said plurality of feature quantity combinations; and computing a correlation coefficient between said plurality of feature quantity combinations and said registered feature quantity to classify said predetermined information by use of said correlation coefficient, wherein generating the first feature quantity combinations comprises:

obtaining a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

17. A recognition apparatus capable of obtaining a feature quantity N dimensions, N being an integer of at least two, to execute recognition processing for classifying predetermined information, comprising:

storage means for storing a predetermined learner obtained as a result of learning processing and information about said feature quantity;

combination generating means for obtaining, from said information, said feature quantity and generating a plurality of feature quantity combinations having corresponding dimensions that fail to exceed the N dimensions of said feature quantity; and classification processing executing means for computing a correlation coefficient between said plurality of feature quantity combinations and a registered feature quantity matching each dimension of said plurality of feature quantity combinations, predetermined information being classified on the basis of said learner by use of said correlation coefficient;

wherein said combination generating means is further configured to:

obtain a matrix comprising elements corresponding to the N dimensions of the feature quantity, the elements being output by Gabor filters associated with corresponding ones of the N dimensions and being arranged within the matrix according to filter directions and frequencies associated with the Gabor filters; and generate said first feature quantity combinations by combining elements within corresponding continuous areas of the matrix, the continuous areas being associated with ranges of the filter directions and frequencies of the Gabor filters.

18. The recognition apparatus according to claim 17, wherein said feature quantity is indicative of a particular local feature quantity at a particular feature point used in said learner.

19. The recognition apparatus according to claim 17, wherein said feature quantity is a feature quantity obtained by any of a plurality of the Gabor filters.

20. The recognition apparatus according to claim 17, wherein said plurality of feature quantity combinations comprise a plurality of combinations of matrix elements included in a rectangular area of the matrix associated with predetermined ranges of the filter frequency and filter direction.

21. The recognition apparatus according to claim 17, wherein said classification processing executing means classifies said predetermined information by use of a boosting algorithm.

22. An information recognition method for use in a recognition apparatus having a predetermined learner and capable executing recognition processing for classifying predetermined information, and the method comprising the steps of:

obtaining a feature quantity of N dimensions, N being an integer of at least two from a storage;

generating a plurality of feature quantity combinations having corresponding dimensions that fail to exceed the N dimensions of said feature quantity from said predetermined information by use of said learner and said feature quantity;

obtaining a registered feature quantity matching each dimension of said plurality of feature quantity combinations;

computing a correlation coefficient between said generated plurality of feature quantity combinations and said registered feature quantity; and classifying said predetermined information on the basis of said learner by use of said correlation coefficient, wherein generating the feature quantity combinations comprises:

obtaining a matrix comprising elements corresponding to the N dimensions of the feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

23. A non-transitory computer-readable medium for causing program configured to make a computer to execute recognition processing for classifying predetermined information by use of a predetermined learner obtained as a result of learning processing, comprising the steps of:

obtaining a feature quantity of N dimensions, N being an integer of at least two from a storage;

generating a plurality of feature quantity combinations having corresponding dimensions that fail to exceed the N dimensions of said feature quantity from said predetermined information by use of said learner and said feature quantity;

obtaining a registered feature quantity matching each dimension of said plurality of feature quantity combinations;

computing a correlation coefficient between said generated plurality of feature quantity combinations and said registered feature quantity; and classifying said predetermined information on the basis of said learner by use of said correlation coefficient, wherein generating the feature quantity combinations comprises:

obtaining a matrix comprising elements corresponding to the N dimensions of the feature quantity, the elements being output by Gabor filters associated with corresponding ones of the N dimensions and being arranged within the matrix according to filter directions and frequencies associated with the Gabor filters; and generating said first feature quantity combinations by combining elements within corresponding continuous areas of the matrix, the continuous areas being associated with ranges of the filter directions and frequencies of the Gabor filters.

24. An information processing apparatus, comprising:

a combination generator configured to obtain a first feature quantity of N dimensions, N being an integer of at least two, from first information prepared for execution of learning and using said first feature quantity to generate at least two first feature quantity having corresponding dimensions that fail to exceed the N dimensions of said first feature quantity; and a learning processing executer configured to compute a correlation coefficient between said first feature quantity combinations and a learning model feature quantity matching each dimension of said first feature quantity combinations and, by use of said first correlation coefficient, classifying said first information to execute learning processing for classifying predetermined second information, wherein said combination generator is further configured to:

obtain a matrix comprising elements corresponding to the N dimensions of the first feature quantity, the elements being output by Gabor filters associated with corresponding ones of the N dimensions and being arranged within the matrix according to filter directions and frequencies associated with the Gabor filters; and generate said first feature quantity combinations by combining elements within corresponding continuous areas of the matrix, the continuous areas being associated with ranges of the filter directions and frequencies of the Gabor filters.

25. A recognition apparatus capable of executing recognition processing for classifying predetermined information by use of a predetermined learner obtained as a result of learning processing, comprising:

a combination generator configured to obtain, from said predetermined information, said predetermined feature quantity having less than N dimensions determined beforehand on a basis of said learner to generate a plurality of feature quantity combinations having less than N dimensions of said feature quantity; and a classification processing executer configured to compute a correlation coefficient between said feature quantity combinations and a registered feature quantity matching each dimension of said feature quantity combinations to classify said predetermined information on the basis of said learner by use of said correlation coefficient, wherein said classification processing executer is further configured to:

obtain a matrix comprising elements corresponding to the dimensions of the first feature quantity, the elements being output by Gabor filters associated with corresponding ones of the dimensions and being arranged within the matrix according to filter directions and frequencies associated with the Gabor filters; and generate said first feature quantity combinations by combining elements within corresponding continuous areas of the matrix, the continuous areas being associated with ranges of the filter directions and frequencies of the Gabor filters.

26. A recognition apparatus capable of executing recognition processing for classifying predetermined information, comprising:

a storage configured to store a predetermined learner obtained as a result of learning processing and information about a feature quantity;

a combination generator configured to obtain, from said predetermined information, feature quantity having N dimensions, N being an integer of at least two, and generating a plurality of feature quantity combinations having corresponding dimensions that fail to exceed the N dimensions of said feature quantity; and a classification processing executer configured to compute a correlation coefficient between said plurality of feature quantity combinations and a registered feature quantity matching each dimension of said plurality of feature quantity combinations, predetermined information being classified on the basis of said learner by use of said correlation coefficient;

wherein said classification processing executer is further configured to:

obtain a matrix comprising elements corresponding to the N dimensions of the feature quantity, the elements being output by Gabor filters associated with corresponding ones of the N dimensions and being arranged within the matrix according to filter directions and frequencies associated with the Gabor filters; and generate said first feature quantity combinations by combining elements within corresponding continuous areas of the matrix, the continuous areas being associated with ranges of the filter directions and frequencies of the Gabor filters.

* * * * *